(12) United States Patent  
Jacob et al.

(10) Patent No.: US 9,176,581 B2  
(45) Date of Patent: Nov. 3, 2015

(54) SYSTEM AND METHOD FOR INFERRING USER INTENT BASED ON EYE MOVEMENT DURING OBSERVATION OF A DISPLAY SCREEN

(71) Applicant: Intel Corporation, Santa Clara, CA (US)

(72) Inventors: Michal Jacob, Haifa (IL); Raanan Yehezkel, Kiryat Ekron (IL)

(73) Assignee: Intel Corporation, Santa Clara, CA (US)

( * ) Notice: Subject to any disclaimer, the term of this patent is extended or adjusted under 35 U.S.C. 154(b) by 231 days.

(21) Appl. No.: 13/631,589

(22) Filed: Sep. 28, 2012

(65) Prior Publication Data

US 2014/0096077 A1    Apr. 3, 2014

(51) Int. Cl.
*G06F 3/033* (2013.01)
*G06F 3/048* (2013.01)
*G06F 3/01* (2006.01)
*G06F 3/0482* (2013.01)

(52) U.S. Cl.
CPC .............. *G06F 3/013* (2013.01); *G06F 3/0482* (2013.01); *G06F 3/033* (2013.01)

(58) Field of Classification Search
CPC ................................ G06F 3/0482; G06F 3/033
USPC ..................................................... 715/810, 702
See application file for complete search history.

(56) References Cited

U.S. PATENT DOCUMENTS

| 2005/0116929 A1* | 6/2005 | Molander et al. .............. 345/157 |
| 2009/0112621 A1* | 4/2009 | Jung et al. ........................ 705/2 |
| 2010/0100001 A1* | 4/2010 | Aguilar et al. ................. 600/544 |

* cited by examiner

*Primary Examiner* — Andrea Leggett
(74) *Attorney, Agent, or Firm* — Barnes & Thornburg LLP

(57) ABSTRACT

A device, method, and system for inferring user intent to perform an action on a computing device includes monitoring the eye movement patterns of a user and determining the action to be performed based on the eye movement patterns. Signals relating to the eye movement of the user while observing a display screen of the computing device are processed to produce at least one eye movement feature. One or more classifiers are generated based on a training set of data of the eye movement feature over a time interval in which the user observes the display screen with an intent to activate the action. Thereafter, an eye-movement-pattern of the user may be analyzed, and features may be extracted, as the user is observing the display screen. The intended action is automatically activated if the user intent is inferred using the one or more of the classifiers.

23 Claims, 7 Drawing Sheets

SYSTEM AND METHOD FOR INFERRING USER INTENT BASED ON EYE MOVEMENT DURING OBSERVATION OF A DISPLAY SCREEN

BACKGROUND

Natural observation by humans of a scene includes a series of fixations and saccades, which are generally spread (not uniformly) over the visual scene. Fixations are observations of a certain point in the visual field, leading to an accurately processed input spanning approximately two degrees of the fixation point. There are typically 3-4 fixations per second, with typical durations of 200-300 milliseconds. Saccades relocations of the point of fixation that change the point of fixation from an origination point to a different point, and generally last about 40 milliseconds or so (depending on the saccade amplitude).

Personal computing devices are ubiquitous in modern society, and are typically used to execute myriad user applications including, for example, word processing applications, personal entertainment applications, informational applications, audio, video and or still image applications and the like. Many such applications include one or more activation graphics which, when selected by the user, initiates a corresponding action within the user application. Eye movements of users viewing the display screen of such devices can be processed to allow for automatic activation of one or more such activation graphics during execution of a user application.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
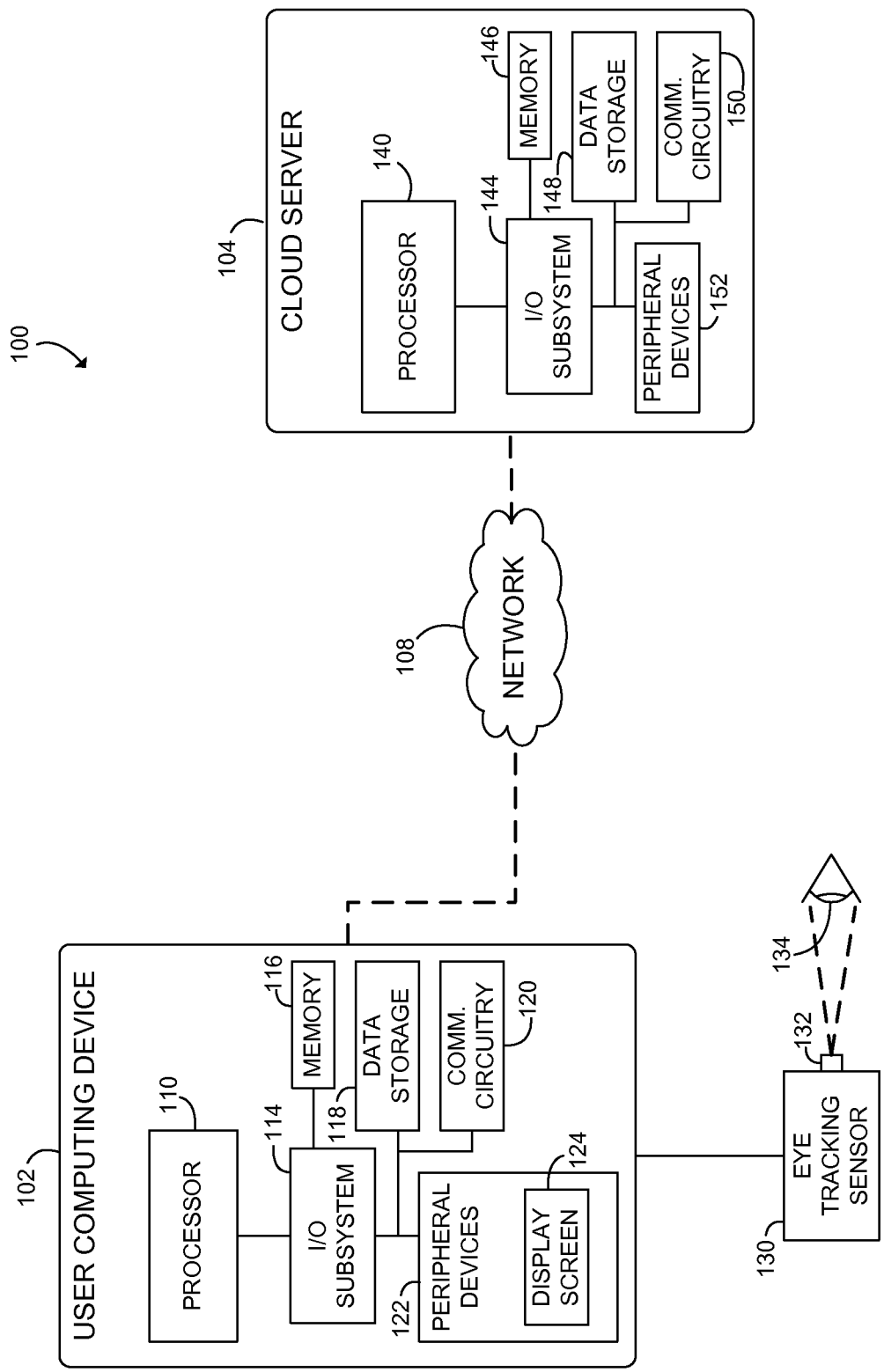
FIG. 1 is a simplified block diagram of at least one embodiment of a system for inferring user intent based on eye movement during observation of a display screen.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an embodiment of a system 100 for inferring user intent of an action on a display screen based on eye movement of the user during observation of the display screen is shown. In the illustrative embodiment, the system 100 includes a user computing device 102 coupled to an eye tracking sensor 130 (e.g., a camera) for monitoring movement of at least one of the user's eyes 134. As discussed in more detail below, graphical images produced during execution by the user computing device 102 and/or a cloud server 104 of one or more applications are displayed on a display screen 124 of the user computing device 102. As the user views the display screen 124, electrical signals produced by the eye tracking sensor 130, and/or the received eye tracking raw data, are processed to determine the user's eye movement patterns. In some embodiments, the user is guided through a number of training sessions to train the system 100 in which the user is directed, during execution of an application to observe the display screen 124 with the intent to perform a specific action, which may or may not be associated with an action graphic or icon displayed on the display screen 124. Optionally, the training sessions may also include one or more training sessions in which the user is directed to observe the display screen 124 with the intent not to perform the specific action. In any case, signals produced by the eye tracking sensor 130 (and/or data extracted therefrom) during such training sessions are recorded to produce a training set of user eye movement patterns for the specific action. A chosen machine learning algorithm is then applied to the training set of user eye movement patterns to generate and store a classifier that corresponds to the specific action. Thereafter, during subsequent observation of the display screen 124 by the user while the application is being executed, the signals produced by the eye tracking sensor 130 are continually processed to analyze the user's eye-movement-pattern and used to invoke one or more of the stored classifiers to infer the user's intent. If a match between the user's eye-movement-pattern and one or more of the classifiers, the corresponding specific action is initiated. One or more of the stored classifiers may illustratively be refined by updating the corresponding training set with eye movement patterns recorded during observation of the display screen 124 by the user while the application is being executed, and then either re-learning the corresponding classifier using the updated training set or updating the classifier using the newly added training set (using, for example, a suitable machine learning algorithm).

In the embodiment illustrated in FIG. 1, the user computing device 102 may be embodied as any type of computing device capable of performing the functions described herein. For example, each of the user computing device 102 may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a network appliance, a web appliance, a distributed computing system, a multiprocessor system, a processor-based system, a consumer electronic device, a digital television device, a set top box, and/or any other computing device configured to store and access data, and to execute electronic cloud software and related applications. Additionally, although the system 100 is illustrated in FIG. 1 as including one user computing device 102, it should be appreciated that the system 100 may include any number of user computing devices.

In the illustrative embodiment of FIG. 1, the user computing device 102 includes a processor 110, an I/O subsystem 114, a memory 116, a data storage 118, a communication circuitry 120, and one or more peripheral devices 122. Of course, the user computing device 102 may include other or additional components, such as those commonly found in a digital sign and/or computer (e.g., various input/output devices), in other embodiments. Additionally, in some embodiments, one or more of the illustrative components may be incorporated in, or otherwise from a portion of, another component. For example, the memory 116, or portions thereof, may be incorporated in the processor 110 in some embodiments.

The processor 110 may be embodied as any type of processor currently known or developed in the future and capable of performing the functions described herein. For example, the processor may be embodied as a single or multi-core processor(s), digital signal processor, microcontroller, or other processor or processing/controlling circuit. Similarly, the memory 116 may be embodied as any type of volatile or non-volatile memory or data storage currently known or developed in the future and capable of performing the functions described herein. In operation, the memory 116 may store various data and software used during operation of the user computing device 102 such as operating systems, applications, programs, libraries, and drivers. The memory 116 is communicatively coupled to the processor 110 via the I/O subsystem 114, which may be embodied as circuitry and/or components to facilitate input/output operations with the processor 110, the memory 116, and other components of the user computing device 102. For example, the I/O subsystem 114 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 114 may form a portion of a system-on-a-chip (SoC) and be incorporated, along with the processor 110, the memory 116, and other components of the user computing device 102, on a single integrated circuit chip.

The communication circuitry 120 of the user computing device 102 may include any number of devices and circuitry for enabling communications between the user computing device 102 and one or more other external electronic devices and/or systems. Similarly, the peripheral devices 122 may include any number of additional input/output devices, interface devices, and/or other peripheral devices. For example, the peripheral devices 122 will typically include a display screen 124 and associated graphics circuitry and, in some embodiments, may further include a keyboard, a mouse, audio processing circuitry (including, e.g., amplification circuitry and one or more speakers), and/or other input/output devices, interface devices, and/or peripheral devices.

As discussed above, the user computing device 102 also includes the eye tracking sensor 130, which may be electrically connected to the user computing device 102 via a connection interface. The eye tracking sensor 130 may be embodied as any type of device, or collection of devices, capable of tracking movements of the user's eyes as discussed herein. For example, the eye tracking sensor 130 may be embodied as a camera, an infra-red camera with additional light emitting diodes (LEDs), and/or other types of eye tracking devices. In the illustrative embodiment of FIG. 1, the eye tracking sensor 130 is embodied as a video camera including at least one lens 132 positioned to track movements of at least one eye 134 of a user of the user computing device 102. In some embodiments, the eye tracking sensor 130 may illustratively be attached to, or be integral with, the user computing device 102.

In some embodiments, the memory 116 and/or data storage 118 has stored therein one or more application programs, and the processor 110 is operable to execute the one or more application programs and control the display screen 124 to display corresponding graphical information thereon. In some embodiments, the system 100 may include a cloud server 104 configured to store and/or execute the one or more application programs, and in such embodiments the user computing device 102 may operate as a thin-client device. Although only one such cloud server 104 is shown in FIG. 1, it should be appreciated that, in other embodiments, the system 100 may include any number of cloud servers.

The cloud server 104 may be embodied as any type of server (e.g., a web server) or similar computing device capable of performing the functions described herein. In the illustrative embodiment of FIG. 1, the cloud server 104 includes a processor 140, an I/O subsystem 144, a memory 146, a data storage 148, a communication circuitry 150, and one or more peripheral devices 152. Those components of the cloud server 104 may be similar to the corresponding components of the user computing device 102, the description of which is applicable to the corresponding components of the cloud server 104 and is not repeated herein for clarity of the description.

The communication circuitry 150 of the cloud server 104 may include any number of devices and circuitry for enabling communications between the cloud server 104 and the user computing device 102. Although only one such user computing device 102 is illustrated in FIG. 1, it will be appreciated that the communication circuitry 150 may communicate with any number of user computing devices 102 and/or other electronic devices and/or systems. Additionally, in some embodiments, the cloud server 104 may also include one or more peripheral devices 152. Such peripheral devices 152 may include any number of additional input/output devices, interface devices, and/or other peripheral devices commonly associated with a server or computing device.

In the illustrated embodiment, communication between the user computing device 102 and the cloud server 104 takes place via a network 108. In one embodiment, the network 108 may represent a wireless network and may be or include, for example, a local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the user computing device 102 and the cloud server 104 may be, in whole or in part, a wired connection. Generally, the communication circuitry 120 of the user computing device 102 and the communication circuitry 150 of the cloud server 104 may be configured to use any one or more, or combination, of communication protocols to communicate with each other such as, for example, a wired network communication protocol (e.g., TCP/IP), a wireless network communication protocol (e.g., Wi-Fi®, WiMAX), a cellular communication protocol (e.g., Wideband Code Division Multiple Access (W-CDMA)), and/or other communication protocols. As such, the network 108 may include any number of additional devices, such as additional computers, routers, and switches, to facilitate communications between the user computing device 102 and the cloud server 104.

Figure 2:
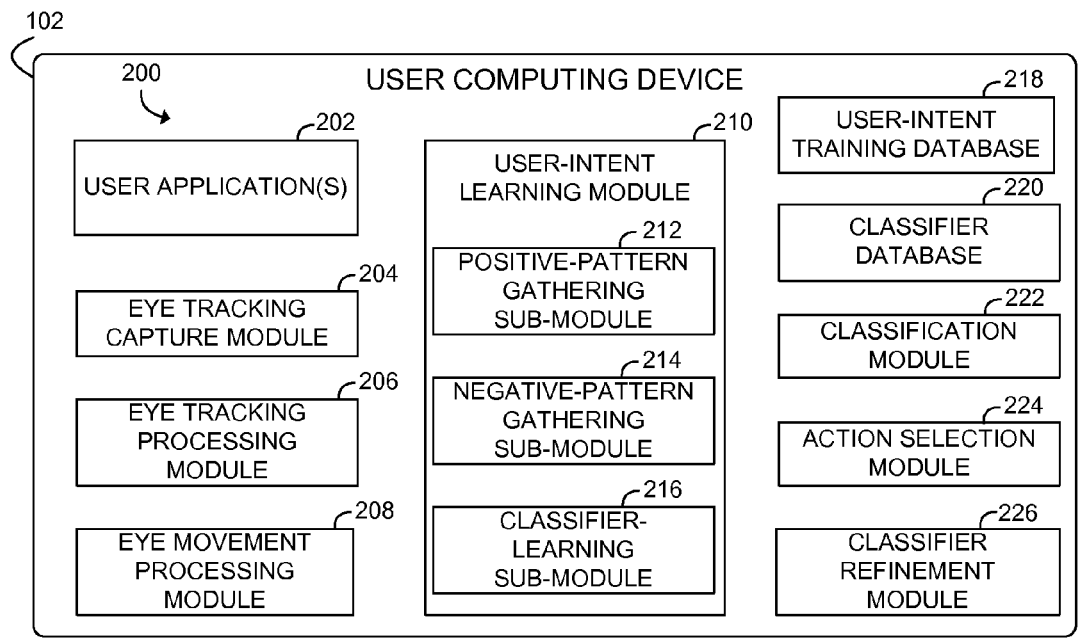
FIG. 2 is a simplified block diagram of at least one embodiment of an environment of the user computing device illustrated in the system of FIG. 1.

Referring now to FIG. 2, a simplified block diagram is shown of an environment 200 of the user computing device 102 illustrated in FIG. 1. In the illustrative embodiment, the environment 200 includes one or more user applications 202, each of which is executable by the processor 110, and during the execution of each such user application the processor 110 is operable to control the display screen 124 to display thereon one or more graphics associated with the user application. The one or more user applications 202 may typically be stored in the memory 116 and/or data storage 118 in the form of one or more software programs, each of which may include one or more sets of instructions executable by the processor 110. Examples of such one or more user applications 202 may include, but should not be limited to, one or more word processing applications, one or more text and/or graphics viewing applications, one or more internet web browsers, one or more electronic mail service applications, one or more text, image and/or video messaging service applications, one or more graphics design applications, one or more audio and/or visual (e.g., photo or video) viewing applications, one or more audio and/or visual processing applications, one or more game applications, one or more user entertainment applications, one or more informational applications, or the like.

The environment 200 of the user computing device 102 also includes an eye tracking capture module 204, which illustratively includes one or more software programs, e.g., one or more sets of instructions, executable by the processor 110 to process the signals produced by the eye tracking sensor 130 and convert such signals to raw data of the user's eye movement. In some embodiments, the eye tracking sensor 130 may include the eye tracking capture module 204, and in such embodiments the signals produced by the eye tracking sensor 130 may be embodied as the raw data (e.g., video image files) of eye movement of the user of the user computing device 102 (e.g., data indicative of the captured samples such as, for example, gaze points on the display 3D positions of the eyes, etc.). In such embodiments, the eye tracking capture module 204 may be omitted from the user computing device 102.

The environment 200 may also include an eye tracking processing module 206 to process the output generated by the eye tracking sensor 130 and/or the eye tracking capture module 204 to generate classifications of eye movements. Such classifications may include, for example, indicia of the user's fixations and saccades as determined based on the raw data generated by the eye tracking sensor 130 and/or the eye tracking capture module 204. The eye tracking processing module 206 may moreover determine or generate individual parameters of such classifications (e.g., fixation duration, saccade amplitude, etc.). In some embodiments, the eye tracking processing module 206 may be embodied as, or otherwise include, eye tracking software and/or firmware similar to the eye tracking capture module 204.

The environment 200 also includes an eye movement processing module 208, which illustratively includes one or more software programs, e.g., one or more sets of instructions, executable by the processor 110 to process the eye movement classifications produced by the eye tracking processing module 206 during observation of the display screen 124 by the user and to determine one or more eye movement features that may be used for inference of user intent as will be described in greater detail below. The eye movement processing module 208 may be configured to perform several functions including, but not limited to, managing the various eye movement patterns, extracting features from such patterns (e.g., jointly with or to feed the user-intent learning module 210 discussed below). Additionally, in some embodiments, the eye movement processing module 208 may be configured to perform some or all of the functions of the eye tracking processing module 206. For example, in some embodiments, the eye movement processing module 208 and the eye tracking processing module 206 may be embodied as a single processing module configured to process the output generated by the eye tracking sensor 130 and/or the eye tracking capture module 204 to determine one or more eye movement features based therein.

The one or more eye movement features that may be determined by the eye movement processing module 208 may include, but should not be limited to, fixation count, i.e., the number of fixations of the user's eyes during a test period, fixation duration, i.e., the duration of each of the fixations, total viewing time, i.e., the total fixation durations on a region within the test period, sequential distance, i.e., the number of intervening fixations between fixations on a specified object or location, proportion of gaze to each of a number of specified regions on the display screen 124, successive viewing to the same region of the display screen 124, frequency of observation, blink frequency, transition probabilities, i.e., probabilities of transitions between the various specified regions of the display screen 124, percentage of inspected regions, i.e., relative to the total number of specified regions, time to first fixation on the specified object or location, i.e., relative to the starting time of the test period, first fixated region of the display screen 124, fixation rate, e.g., fixations per second, saccade amplitude, e.g., mean speed of saccades or mean time of saccades, and frequency of correcting saccades, and/or other types of eye movement features and/or parameters. It will be understood that the eye movement processing module 208 may produce all or any sub-combination of such eye movement features and/or may produce one or more eye movement features that do not appear on the foregoing list. In any case, as will be described more fully below, the user computing device 102 and/or the cloud server 104 is operable to use the one or more eye movement features for inference of user intent.

The environment 200 of the user computing device 102 further includes a user-intent learning module 210. The user-intent learning module 210 illustratively includes a positive-pattern gathering sub-module 212, and may optionally include a negative-pattern gathering sub-module 214. As will be described in greater detail below with respect to FIG. 4, the positive-pattern gathering sub-module 212 guides the user through a number of training sessions of the user computing device 102 in which the user observes graphical images produced by execution of the user application on the display screen 124 with the intent to perform a specific action (e.g., with the intent to select a graphic icon associated with the specific action or to otherwise perform the specific action when no associated graphic icon is displayed). If included in the user-intent learning module 210, one embodiment of the negative-pattern gathering sub-module 214 guides the user through a number of additional sessions in which the user observes the graphical images produced by execution of the user application on the display screen 124 with the intent to not perform a specific (e.g., with the intent not to select a graphic icon associated with the specific action or to otherwise not perform the specific action when no associated graphic icon is displayed). One illustrative process for carrying out a number of such negative-pattern gathering sessions will be described in detail below with respect to FIG. 5. In some embodiments, one or more of the negative pattern training sessions may be configured to monitor the user while the user observes the graphical images produced by execution of the user application on the display screen 124 with the intent to perform an action other than the action specified in the one or more positive-pattern gathering sessions, i.e., with the intent to select or initiate an action other than the action specified during the positive-pattern gathering session(s). Additionally or alternatively, in some embodiments, previously gathered positive patterns for other actions may be used as negative pattern samples for the current specified action.

The results of the one or more positive-pattern gathering sessions, as well as those of any of the optional negative-pattern gathering sessions that have been conducted, form a user-intent training set for the specific action. Such user-intent training sets may be stored in a user-intent training database 218. Illustratively, each specific action desired to be initiated based on an inference of user intent will require a separate user-intent training set, and the user-intent training database 218 will therefore typically have a number of different user-intent training sets stored therein. Likewise, user-intent training sets will typically, although not necessarily, be different for different users, and the user-intent training database 218 will therefore may have stored therein a number of different training sets for each of a number of different users.

The user-intent learning module 210 further includes a classifier-learning sub-module 216. As will be described in greater detail below with respect to FIG. 4, the classifier-learning sub-module 216 processes the training sets stored in the user-intent training database 218 and learns one or more classifiers for each such training set. A "classifier" is generally a mathematical construct used to differentiate between different data patterns, and a classifier may typically be used when processing new observations as a tool for identifying a category, or cluster, to which the new observation belongs. For example, a plurality of classifiers may be initially learned each from a different collection of categorized observations called training sets. Depending on the particular type of classifier, each classifier may be trained to distinguish/identify a single intent or distinguish/identify between two or more intents. As discussed in more detail below, classifiers are used to infer user intent by supplying new user eye movement patterns (e.g., "run-time" patterns) to the one or more classifiers. Each classifier generates a score as a function of the new user eye movement pattern, and the new user eye movement pattern may be determined to be generally closely related to the category of observations from which the classifier having the highest score was derived.

Following the one or more positive- (and optionally negative-) pattern gathering sessions for a given action and user as described above, the classifier-learning sub-module 216 learns a classifier from the corresponding training set stored in the user-intent training database 218, and stores this classifier in a classifier database 220. Generally, the classifier database 220 may have stored therein many different classifiers, each from a different one of the training sets stored in the user-intent training database 218.

In some embodiments, the classifier-learning sub-module 216 is embodied as, or otherwise includes, a machine learning algorithm for learning the classifiers, which may result from a generative or a discriminative model (or a combination of both, i.e., a generative-discriminative model). The machine learning algorithm is illustratively a supervised or semi-supervised learning algorithm, although the present disclosure contemplates that the machine learning algorithm may alternatively be embodied as, or otherwise include, an unsupervised learning algorithm, a reinforcement learning algorithm, an active learning, or other type of learning algorithm. In other embodiments, the classifier-learning sub-module 216 is or includes one or more learning algorithms other than, or in addition to, a machine learning algorithm. In any case, the learning algorithm may use any classification and/or clustering method, examples of which may include, but are not be limited to, Support Vector Machine (SVM), spectral clustering, Fisher Discriminant Analysis, Bayes classifiers, Mixture of Gaussians, and/or the like.

The environment 200 of the user computing device 102 further includes a classification module 222. After the user computing device 102 has been initially trained (i.e., after one or more classifiers have been generated), the classification module 222 monitors the eye movement patterns of the user during the user's observation of the display screen 124 while the user application is being executed and attempts to classify the user's intent based on the user's eye movement patterns and the previously generated classifiers. To do so, the classification module 222 receives the eye movement features generated by the eye movement processing module 208 and invokes one or more classifiers stored in the classifier database 220. As discussed above, each classifier generates a score for the belief that the supplied eye movement pattern of the user belongs to one or more categories for which the classifier was trained. Based on the generated scores (e.g., analysis of the highest score), the classification module 222 infers the user's intent to perform an associated action.

The environment 200 of the user computing device 102 also includes an action selection module 224. The action selection module 224 receives the output of the classification module 222, which is indicative of the user's inferred intent to perform a specified action. Based on such data, the action selection module 224 automatically performs, or otherwise initiates the performance of, the specified action. If the specified action is application specific, the environment 200 may include multiple action selection modules 224, one for each associated application. Additionally, the action selection module(s) may be embodied as, or otherwise include, application program interfaces (APIs) of the associated applications to facilitate the automatic performance of the specified action.

The environment 200 of the user computing device 102 illustrated in FIG. 2 may further include a classifier refinement module 226. As will be described in greater detail below with respect to FIG. 9, the classifier refinement module 226 is configured to monitor eye movement patterns of the user during the user's observation of the display screen 124 while the user application is being executed, to add such eye movement patterns to one or more of the training sets stored in the user-intent training database 218 based on any one or a number of different criteria, and to request the classifier learning module to re-learn the classifier corresponding to any such updated training set. Additionally or alternatively, a classifier may be refined without the need to re-learn the classifier. Rather, the features of the classifier may be adjusted and/or updated according to the new eye movement pattern using an suitable online machine learning algorithm.

Figure 3:
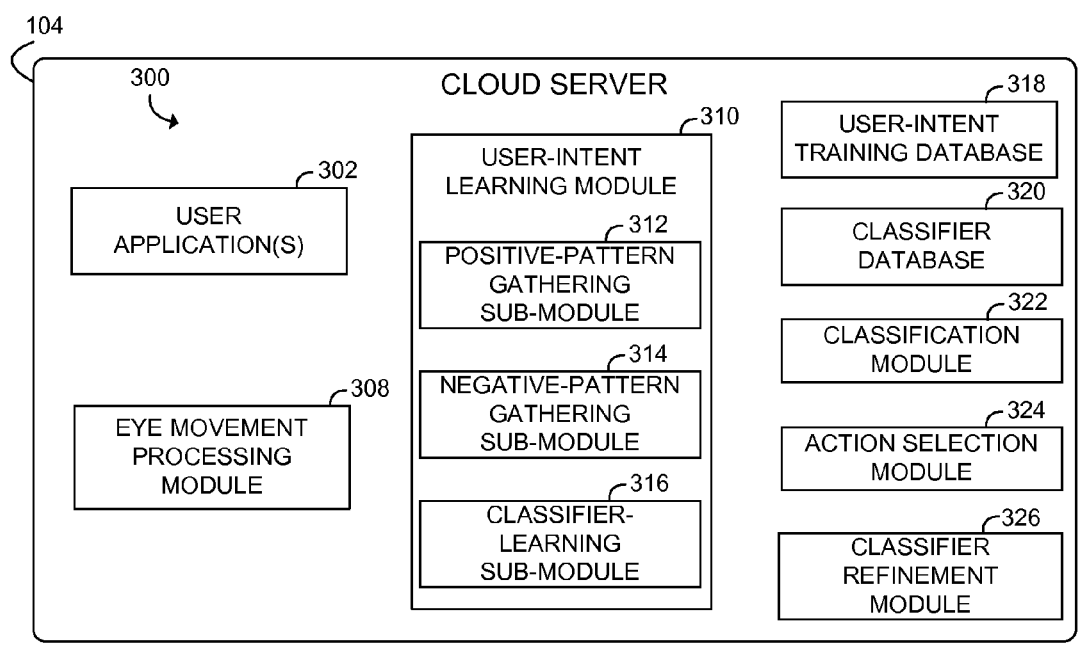
FIG. 3 is a simplified block diagram of at least one embodiment of an environment of the cloud server illustrated in the system of FIG. 1.

Referring now to FIG. 3, a simplified block diagram is shown of an example environment 300 of the cloud server 104 illustrated in FIG. 1 (i.e., in embodiments of the system 100 that include the cloud server 104). In some embodiments of the system 100, as discussed above, the user computing device 102 may operate as a stand-alone computing device, and the cloud server 104 may therefore be omitted in such embodiments. In such embodiments, the user computing device 102 includes a number of user applications and operational modules as described above with respect to FIG. 2. In other embodiments, the user computing device 102 may operate, in whole or in part, as a thin-client device and, in such embodiments, the cloud server 104 is included and may include one or more of the modules illustrated and described with respect to FIG. 2. In the embodiment illustrated in FIG. 3, for example, the cloud server 104 may include any one or combination of one or more user application(s) 302, an eye movement processing module 308, a user-intent learning module 310, which may include a positive-pattern gathering sub-module 312, a negative-pattern gathering sub-module 314 and a classifier learning sub-module 316, a user-intent training database 318, a classifier database 320, a classification module 322, an action selection module 324 and a classifier refinement module 326, wherein each such component is identical in structure and function to like components illustrated and described with respect to FIG. 2. It will be appreciated that any one or combination of the components illustrated as part of the environment 300 of the cloud server 104 may alternatively or additionally be part of the environment 200 of the user computing device 102 and vice versa.

Figure 4:
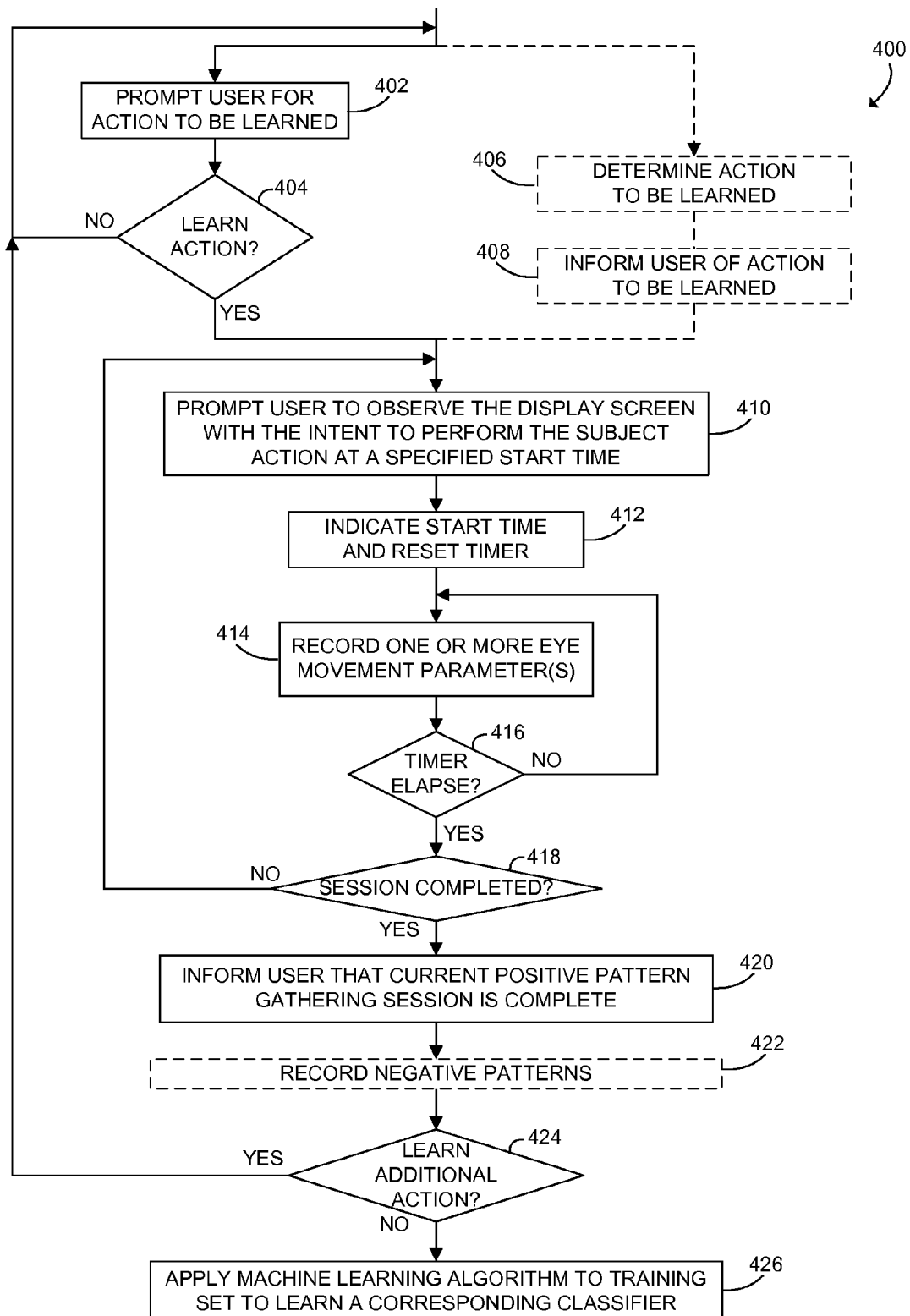
FIG. 4 is a simplified flow diagram of at least one embodiment of a process for learning a classifier for a user intended action on a display screen based on a training set of recorded eye movement patterns of the user during observation of the display screen.

Referring now to FIG. 4, an illustrative embodiment of a method 400 for learning a classifier for a user intended action on a display screen based on a training set of recorded eye movement patterns of the user during observation of the display screen is shown. In some embodiments, the method 400 may be stored in the memory 116 and/or data storage 118 of the user computing device 102 and/or other machine readable media in the form of one or more sets of instructions executable by the processor 110 of the user computing device 102, stored in the memory 146 and/or data storage 148 of the cloud server 104 and/or other machine readable media in the form of one or more sets of instructions executable by the processor 140 of the cloud server 104, or stored in either one or a combination of the memory 116/data storage 118 and the memory 146/data storage 148 and/or other machine readable media in the form of one or more sets of instructions executable by either one or a combination of the processor 110 of the user computing device 102 and the processor 140 of the cloud server 104. For purposes of facilitating an understanding of the method 400, it will be described below as being stored in the memory 116 of the user computing device 102 in the form of one or more sets of instructions executable by the processor 110 of the user computing device 102, although it will be understood that the method 400 may alternatively or additionally be stored and/or executed, in whole or in part, otherwise as just described above.

The method 400 begins at block 402 in which the user computing device 102 may prompt the user to enter, select, or otherwise identify an action (e.g., from a list of available actions) to be learned. Of course, in other embodiments, the user may initiate the learning of an action rather than being prompted to do so. Regardless, it should be understood that the action to be learned will generally be associated with at least one user application(s) 202, and may or may not be embodied as an action that has an associated visual component (e.g., a button or widget) displayed on the display screen 124 during at least part of the execution of the at least one user application(s) 202 (i.e., some actions may not have a corresponding graphic icon). One example action, which will be used below to demonstrate portions of the method 400, is the so-called "Tracked Changes" feature of Microsoft WORD®, a word processing application commercially available from Microsoft Corporation of Redmond, Wash. Other actions associated with Microsoft WORD® and/or other actions associated with other word processing and/or other user applications, without limitation, will occur to those skilled in the art, and any such other actions are contemplated by this disclosure. In any case, in block 404, the user computing device 102 determines whether the user has entered an action to be learned. If not, the method 400 loops back to block 402 and, if so, the method 400 advances to block 410 described below.

In some embodiments, the method 400 may also include blocks 406 and 408. In block 406, the user computing device 102 determines the action to be learned. To do so, the user computing device 102 may use any suitable methodology to determine which action should be learned including, for example, maintaining a list of actions to be learned for a particular application and/or predicting actions to be learned based on historical data. In block 408, the user computing device 102 may inform the user of the action to be learned. Blocks 406 and 408 may be used, for example, in user applications in which it is desirable or necessary for the user computing device 102 to learn at least one action that may be inferred from user intent.

In block 410, the user computing device 102 initiates a positive-pattern gathering session as briefly described above. To do so, the user computing device 102 may prompt the user to observe the display screen 124 with the intent to perform the subject action at a specified start time, or in a time range. Illustratively, the user computing device 102 executes block 410 by controlling the display screen 124 to display a suitable message to the user which requires the user to respond as instructed at a start time communicated to the user via the display screen 124 or at a start time initiated by the user, e.g., via one or more key strokes or the like. However, in other embodiments, the user may not be prompted or directed to observe the display screen 124. For example, in some embodiments, the user may not even be aware that a positive pattern gathering session is being conducted. In such embodiments, the user may simply be monitored while observing the display screen 124 and interacting with the user application executed on the user computing device 102.

Subsequently, in block 412, the user computing device 102 indicates the start time, e.g., by controlling the display screen 124 to display a suitable message, and resets a timer, e.g., a timer application executed by the processor 110, or a timer circuit internal to or coupled to the processor 110. Alternatively, in some embodiments, the user or other entity may indicate the start and ending times of the gathering session so as to define the time window of the pattern learning for the subject action (i.e., without the use of a timer). Thereafter at block 414, the user computing device 102 records (e.g., stores in the user-intent training database 218) one or more of the eye movement feature(s) determined by the eye movement processing module 208 based on the output produced by the eye tracking sensor 130 which tracks at least one eye 134 of the user while the user is observing the display screen with the intent to perform the subject action. Additionally or alternatively, the raw data generated by the eye tracking processing module 206 may be stored in block 414 in the user-intent training database 218.

In block 416, the user computing device 102 determines whether the timer has elapsed (i.e., whether the current recording session is completed). If not, the method 400 loops back to block 414 in which the user computing device 102 continues to record the user's eye movement data. However, if the current recording session is determined to be completed (e.g., the timer has expired or the user or other entity has indicated an end of a learning window), the method 400 advances to block 418. In block 418, the user computing device 102 determines whether the positive pattern gathering session is completed. That is, the user computing device 102 determines whether another recording session is desired or otherwise required. If so, the method loops back to block 410 in which the user may (or may not) be prompted to observe the display screen with the intent to perform the subject action (i.e., a single positive pattern gathering session may include multiple positive pattern recording sessions). However, if the positive pattern gathering session is completed, the method 400 advances to block 420 in which the user computing device 102 informs the user that the current positive pattern gathering session has completed. For example, the user computing device 102 may display a suitable message to the user.

It should be appreciated that the blocks 410-418 of the method 400 guide the user through one or more separate positive pattern recording sessions (i.e., the blocks 410-418 may be repeated to generate additional positive pattern records for a single action). In each positive pattern recording session, the user is directed to observe the display screen 124 with the intent to perform the subject action, which may or may not have associated graphic icon (e.g., a button or widget). In some embodiments, the user is directed to naturally observe the display screen 124 (or otherwise monitored while naturally observing the display screen 124). It is to be understood that the terms "natural observation," "naturally observe," "observe the display screen naturally" and the like refer to the natural manner in which humans visually observe a scene such as a graphic display of a user application running on a user computing device; that is, with multiple fixations and saccades scattered all over the display screen 124 as briefly described above. It should be further appreciated that natural observation of the user application displayed on the display screen 124 with the intent to perform an action does not require any forced effort on the part of the observer beyond that used during natural observation of all or part of the user application displayed on the display screen 124. During each of the separate positive pattern recording sessions, the user is not directed to focus, intensely or otherwise, his or her gaze on the area or region of the displayed graphic content of the user application in which the action is located, but rather to observe the display screen naturally, i.e., with no additional effort or forced action beyond that of natural observation of all or any part of the display graphic content, and with the intent to perform the subject action. With the training set constructed from such natural observations, like natural observation will allow the desired action to occur after the training sessions are completed and a classifier is determined.

For example, and referring back to block 414, the eye movement processing module 208 tracks, via the eye tracking sensor 130 and modules 204, 206, eye movements of the user while the user is observing the user application on the display screen 124 with the intention to perform the subject action, and produces one or more of the eye movement features described above. The user computing device 102 continually records such one or more eye movement features between the start time, e.g., corresponding to the time at which the timer is reset or the user initiates the gathering session, and an end time, e.g., corresponding to the time at which the timer elapses or the user ends the gathering session. Each positive pattern record session thus forms a single positive pattern record (e.g., the eye movement features generated by the eye movement processing module 208 and/or the raw eye movement data generated by the eye tracking processing module 206), which is stored in the user-intent training database 218 for the subject action and user, and at the conclusion of the positive pattern gathering session such eye pattern records for the subject action and user are stored in the user-intent training database 218. The eye pattern records may be embodied as, or otherwise include, the raw data generated by eye tracking processing module 206, the classified fixations and saccades, the eye movement scan path, the set of features extracted by the eye movement processing module 208 (or by the user-intent learning module 210), the resulted classifier, or a combination thereof.

Figure 6:
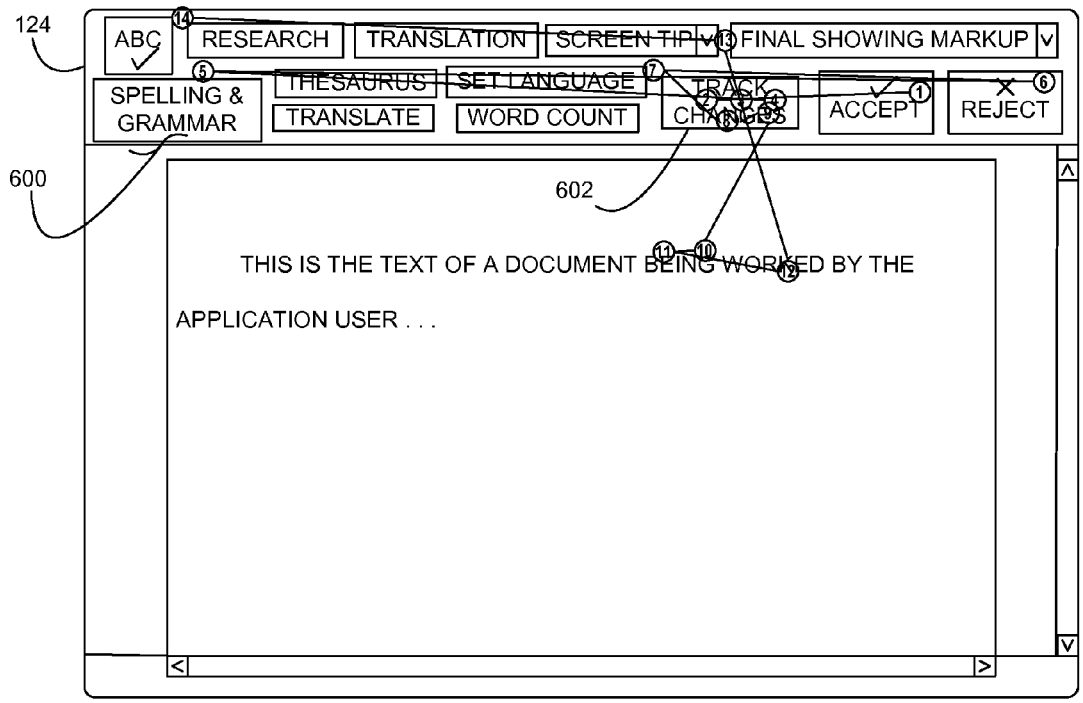
FIG. 6 is a simplified diagram of a display screen of the user computing device during execution of an example application illustrating one example of a positive eye movement pattern, corresponding to user intent to perform an action on the display screen, in accordance with the process of FIG. 4.

Referring now to FIG. 6, a simplified diagram is shown of the display screen 124 of the user computing device 102 during execution of an example user application, which results in graphic content 600 of the user application being displayed on the display screen 124. Superimposed on the graphic content 600 is a series of circled numbers ranging, in this example, between 1 and 14, and the circled numbers represent sequential eye fixation points relative to the displayed content 600 which represent one possible embodiment of a recording of the positive pattern gathering sessions illustrated and described with respect to blocks 410-418 of the method 400 illustrated in FIG. 4. In the illustrative example of FIG. 6, the user application is a word processing application, and the subject action is the "Track Changes" graphic 602. It should be understood, however, the illustrated "Track Changes" action is provided only by way of example, and that the subject action could alternatively be any action, e.g., any item which causes an action to occur within the user application when manually selected, e.g., by a keyboard, mouse, touch, or the like, forming part of the graphic content 600 displayed on the display screen 124 during execution of the user application or other action that does not have a corresponding graphic, e.g., moving a window to a new position. It will be further understood the word processing application illustrated in FIG. 6 is likewise provided only by way of example, and that the user application may alternatively be any application, including an operating system environment, which, when executed by the processor 110 and/or the processor 140, results in the display on the display screen 124 of graphic content.

In the illustrative pattern gathering session of FIG. 6, the eye movement raw data, pattern, and features were analyzed over, for example, a five-second interval, although such interval in other embodiments could be shorter or longer. In the illustrative embodiment of FIG. 6, the user's observation of the displayed graphic content 600 with the intent to perform the subject action, e.g., with the intent to initiate (or select or activate) "Track Changes," resulted in some, but not all, of the fixation points of the user's eyes to occurring the area or region of the "track changes" graphic 602. The fixation points 1, 5-6, 10-12 and 14, for example, are all located well outside of, and substantially remotely from, the "Track Changes" graphic 602 and the fixation points 7 and 13 are located slightly outside of the "Track Changes" graphic, while the fixation points 2-4 and 8-9 are each located on or within the "Track Changes" graphic 602. This pattern demonstrates the general nature of observation with the intent to perform a specific action in that a high percentage of the user's eye fixation points are not located on or within the "track changes" graphic 602, as would more likely be the case if the user had been directed to focus intently on the "track changes" graphic 602. It should be appreciated, however, that some positive-pattern gathering sessions may generate eye movement patterns in which a graphic associated with the subject action has few, or even no, fixation points located thereon. By recording eye movement features during observation with the intent to perform a specific action, the patterns of eye movement, rather than strictly the number and/or duration of eye fixations, are processed to learn a classifier for subsequent inference of user intent as will be described in greater detail below. Subsequent determinations of user intent may thus be accomplished by invoking a set of classifiers with the features of the eye movement pattern. Typically, each classifier is configured to identify a specific action; however, different classification approaches can be adopted. Among such approaches is a hierarchical classification approach in which a pattern is classified into one of a group of actions. Subsequently, a second classifier may be invoked to further classify the same pattern into one of the subgroups that compose the group of actions that were identified by the first classifier. Additional classifiers are invoked until a singly action is recognized (rather than a group of actions). Of course, a combination of different classifiers and classification approaches may be used in some embodiments.

Figure 5:
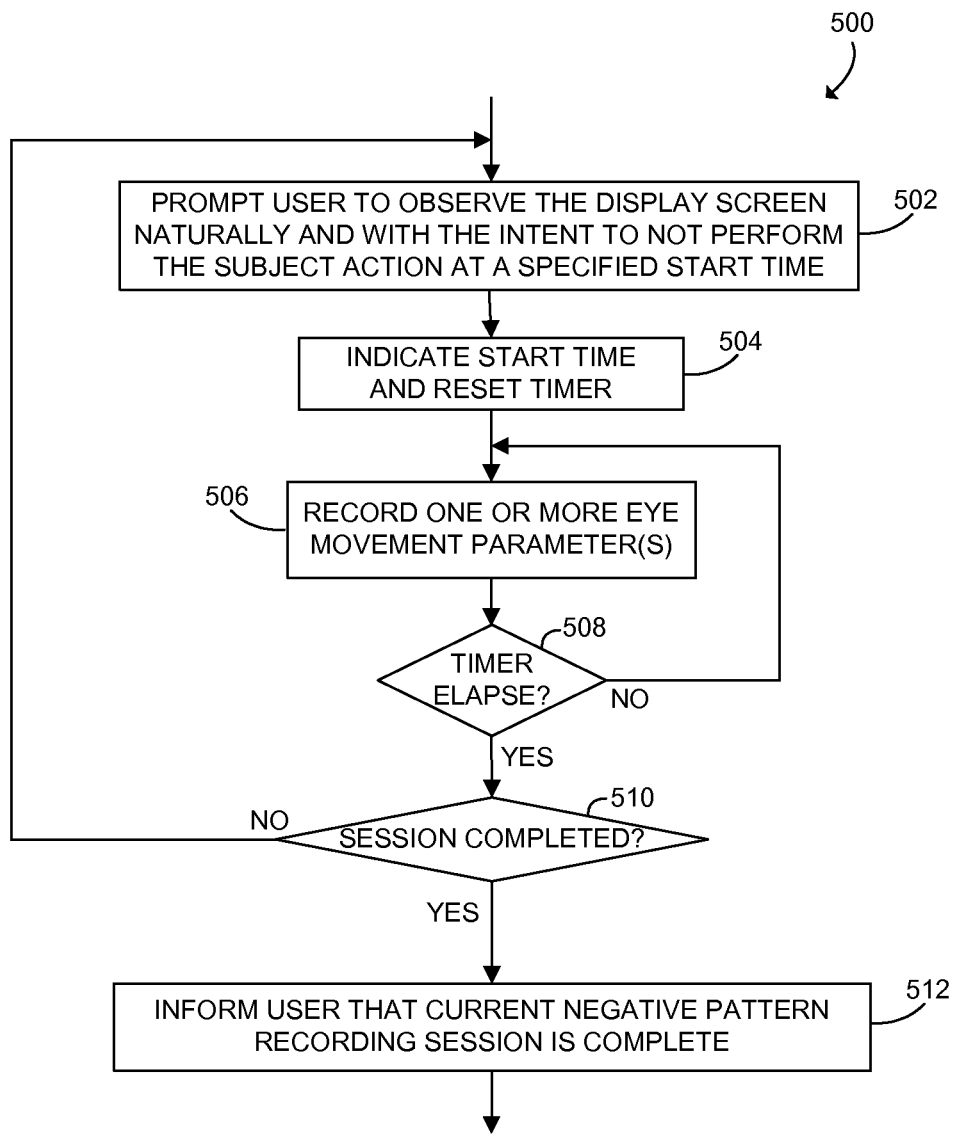
FIG. 5 is a simplified flow diagram of at least one embodiment of an optional process for recording eye movement patterns, corresponding to user intent to not perform the action on the display screen, for inclusion in the training set of recorded eye movement patterns used by the process of FIG. 4.

Referring now back to FIG. 4, the method 400 may in some embodiments include an optional block 422, which may be executed subsequent to block 420 or prior to block 410 (i.e., prior to recordation of the positive pattern session). In block 422, the user computing device 102 directs the user through one or more separate negative pattern gathering sessions, similar to the positive gathering sessions. For example, as shown in FIG. 5, the user computing device 102 may execute a method 500 for guiding the user through the one or more separate negative pattern gathering sessions. The method 500 may be stored in the memory 116 and/or data storage 118 of the user computing device 102 and/or other machine readable media in the form of one or more sets of instructions executable by the processor 110 of the user computing device 102, stored in the memory 146 and/or data storage 148 of the cloud server 104 and/or other machine readable media in the form of one or more sets of instructions executable by the processor 140 of the cloud server 104, or stored in either one or a combination of the memory 116/data storage 118 and the memory 146/data storage 148 and/or other machine readable media in the form of one or more sets of instructions executable by either one or a combination of the processor 110 of the user computing device 102 and the processor 140 of the cloud server 104. For purposes of facilitating an understanding of the method 500, it will be described below as being stored in the memory 116 of the user computing device 102 in the form of one or more sets of instructions executable by the processor 110 of the user computing device 102, although it will be understood that the method 500 may alternatively or additionally be stored and/or executed, in whole or in part, otherwise as just described above.

The illustrative method 500 includes blocks 502-512, many of which are similar or identical to the corresponding blocks of the positive pattern gathering session of FIG. 4, and therefore only a description of the blocks of the method 500 that differ from those of blocks 406-422 will be described here for brevity. In particular, block 502 differs from block 410 in that the user computing device 102 prompts the user to observe the display screen 124 with the intent to not perform the subject action at a specified start time. Block 512 also differs from block 418 in that the user computing device 102 controls the display screen 124 to inform the user that the current negative pattern gathering session has completed. Again, in some embodiments, the user may not be prompted or directed to observe the display screen 124. For example, in some embodiments, the user may not even be aware that a negative pattern gathering session is being conducted. In such embodiments, the user may simply be monitored while observing the display screen 124 and interacting with the user application executed on the user computing device 102.

The method 500 thus guides the user through one or more separate negative pattern training sessions (i.e., the blocks 502-510 may be repeated to generate additional negative pattern records for a single action), which may be less than, equal to, or greater than the corresponding number of positive training sessions. In each negative pattern recording session, the user may (or may not) be directed at block 502 to observe the graphic content of the user application displayed on the display screen 124 with the intent to not perform the subject action that is part of the displayed graphic content. At block 506, the eye movement processing module 208 tracks, via the eye tracking sensor 130, eye movements of the user while the user is observing the user application on the display screen 124 with the intent to not perform the subject action, and analyzes one or more of the eye movement features described above. The user computing device 102 continually records such one or more eye movement features between the start and end times, which may be based on a timer as shown in FIG. 5 or on manual selections by the user. Each negative pattern recording session thus forms a single negative pattern record, which is stored in the user-intent training database 218 for the subject action and user, and at the conclusion of the negative pattern gathering sessions such eye pattern records and/or features for the subject action and user are stored in the user-intent training database 218.

Figure 7:
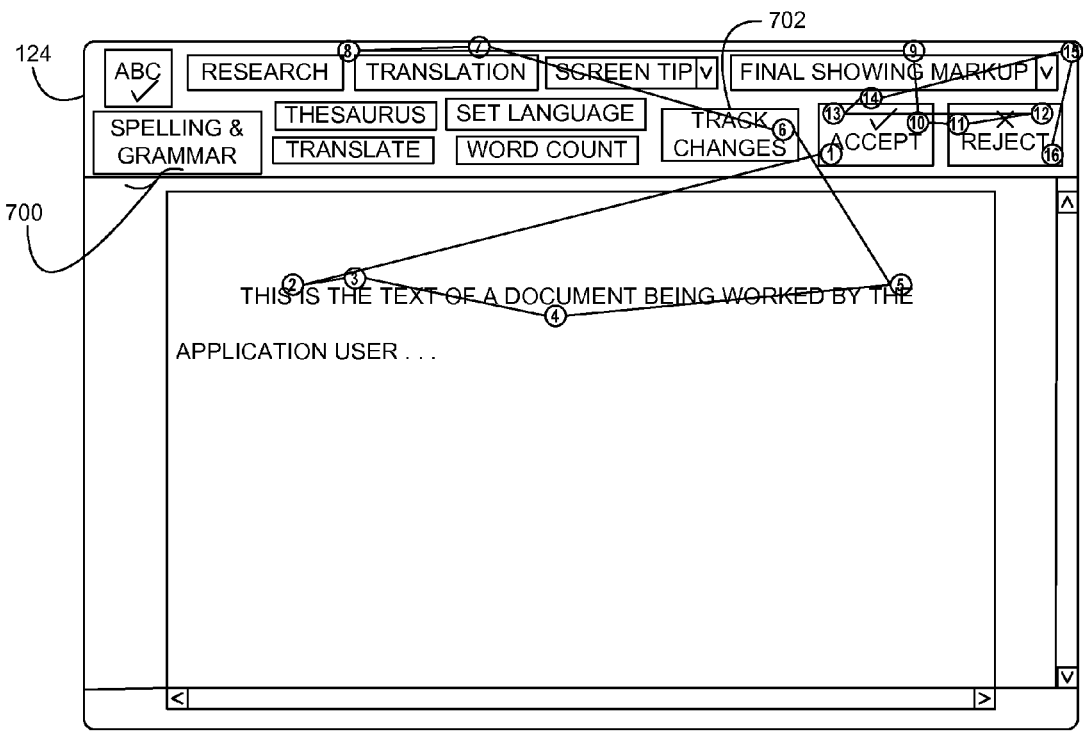
FIG. 7 is a simplified diagram of the display screen shown in FIG. 6 illustrating one example of a negative eye movement pattern, corresponding to user intent to not perform the action on the display screen illustrated in FIG. 6, according to the process of FIG. 5.

Referring now to FIG. 7, a simplified diagram is shown of the display screen 124 of the user computing device 102 during execution of same example user application illustrated in FIG. 6, which results in graphic content 700 of the user application being displayed on the display screen 124. Superimposed on the graphic content 700 is a series of circled numbers ranging, in the illustrative embodiment, between 1 and 16, and the circled numbers represent sequential eye fixation points relative to the displayed content 700 that were recorded during one of the negative pattern training sessions illustrated and described with respect to the method 500 illustrated in FIG. 5 during which the user observes the displayed graphic 700 with the intent not to initiate (or select or activate) the "tracked changes" graphic 702.

In the illustrative negative pattern gathering session of FIG. 7, the eye movement raw data, pattern, and features were analyzed over, for example, a five-second interval, although this interval in other embodiments could be shorter or longer. In the illustrative embodiment of FIG. 7, the user's observation of the displayed graphic content 600 with the intent not to perform the subject action, i.e., with the intent to not initiate (or select or activate) "Track Changes," resulted in some of the fixation points of the user's eyes being located in the text area of the document, e.g., fixation points 2-5, with the others, e.g., fixation points 1 and 6-16, being located in the action graphics area. One of the fixation points 6 is even located generally on the "track changes" graphic 702. It should be understood that one or more fixations points in one or more negative pattern gathering sessions may be located on or within the "Track Changes" graphic 702, as shown with fixation point 6, if that is where a user's eyes occasionally travel to while observing the displayed graphic content 700 with the intent not to initiate "Track Changes" without contradicting the example as a negative example as it is the pattern of the user's eye movements upon which the classifier is determined not the number and/or duration of fixations on or within the "track changes" graphic 702.

The one or more negative pattern recording sessions illustrated in the method 500 of FIG. 5 and the example illustrated in FIG. 7 illustratively represent a form of explicit negative pattern gathering in that the user is instructed to observe the graphic displayed on the display screen with the intent to not initiate (or select or activate) the subject action. Another form of negative pattern gathering that could be substituted for, or added to, the negative pattern gathering sessions illustrated in FIGS. 5 and 7 is neutral observation. During neutral observation, the user would be directed to observe, or simply monitored while observing, the graphic displayed on the display screen 124 not with no intent other than observing the displayed graphic. To do so, the method 500 may be suitability modified to implement the neutral observation (e.g., block 502 would prompt the user to simply naturally observe the display screen with no specific intention). In any case, an embodiment of a neutral observation form of negative pattern gathering will be described further below in connection with the process illustrated in FIG. 9. Another form of negative pattern gathering that could be substituted for, or added to, the negative pattern gathering session illustrated in FIGS. 5 and 7 and/or the neutral observation form of negative pattern gathering just described is positive pattern gathering for one or more actions other than the subject action. Such additional positive pattern training for action other than the subject action may be generated during the gathering sessions for the other actions. In any case, an example of a positive pattern gathering as another form of negative pattern gathering will be described further below in connection with the process illustrated in FIG. 9.

Referring back to FIG. 4, after the positive and any negative gathering sessions are completed, the method 400 advances to block 424 in which the user computing device 102 determines whether another action is to be learned. If so, the method 400 loops back to blocks 402, 406 in which additional gathering sessions for other actions may be initiated or requested. If, however, the no additional actions are to be learned at this time, the method 400 advances to block 426. In block 426, the user computing device 102 applies a learning algorithm, such as a machine learning algorithm as discussed above with respect to the classifier-learning sub-module 216, to the training set for the subject action and user to learn a corresponding classifier or set of classifiers. The training set for the subject action may include positive pattern gathering sessions for the subject action and, in some embodiments, for other actions (i.e., as a negative pattern). Additionally, the training set may include one or more negative pattern gathering sessions and/or neutral pattern gathering sessions.

In embodiments in which positive, negative, and/or neutral pattern records are stored in the user-intent training database as the eye movement raw data generated by the eye tracking processing module 206, the eye movement processing module 208 may be used to extract the eye movement features from the stored raw data and provide those features to the classification module 222 to learn the corresponding classifier or set of classifiers. In any case, the user computing device 102 processes the positive, negative, and/or negative pattern records stored in the user-intent training database 218, learns a classifier for the training set corresponding to the subject action and user, and stores the classifier in the classifier database 220. The processor 110 illustratively uses a learning algorithm, such as a machine learning algorithm, to learn the classifier, and in so doing any such learning algorithm may illustratively employ any classification and/or clustering method, examples of which include, but should not be limited to, Super Vector Machine (SVM), spectral clustering, Fisher Discriminant Analysis, Bayes classifiers, Mixture of Gaussians, and the like.

Following the determination of a classifier, the user computing device 102 may continually monitor eye movement patterns of the user during the user's observation of graphic content displayed on the display screen 124 of the user computing device 102 as a result of execution of one or more of the user application(s) 202. Periodically, the user computing device 102 processes the monitored eye movement patterns to extract features and invoke one or more classifiers stored in the classifier database 220 for the user application currently being executed and/or for the particular user currently operating the user computing device 102. Based on the output of one or more classifiers, the user computing device 102 infers whether the user intends to initiate, e.g., select or activate, a given action. In response, the user computing device 102 automatically initiates, e.g., selects or activates, the corresponding action so that the user does not have to do so manually. Using the example illustrated in FIGS. 6 and 7, if, after the classifier is learned for the "Track Changes" graphic and the user is thereafter observing the graphic content displayed on the display screen 124 resulting from execution by the processor 110 of the word processing application, the processor 110 concludes that just performed eye movement pattern matches the classifier for the "tracked changes" graphic, the processor 110 automatically activates the "Tracked Changes" feature. Of course, it should be appreciated that an eye movement pattern does not have to "match" any of particular positive patterns generated in the positive-pattern gathering sessions. Rather, the eye movement pattern may possess common features, which were extracted from the positive-pattern gathering sessions and learned by the learning algorithm.

Figure 8:
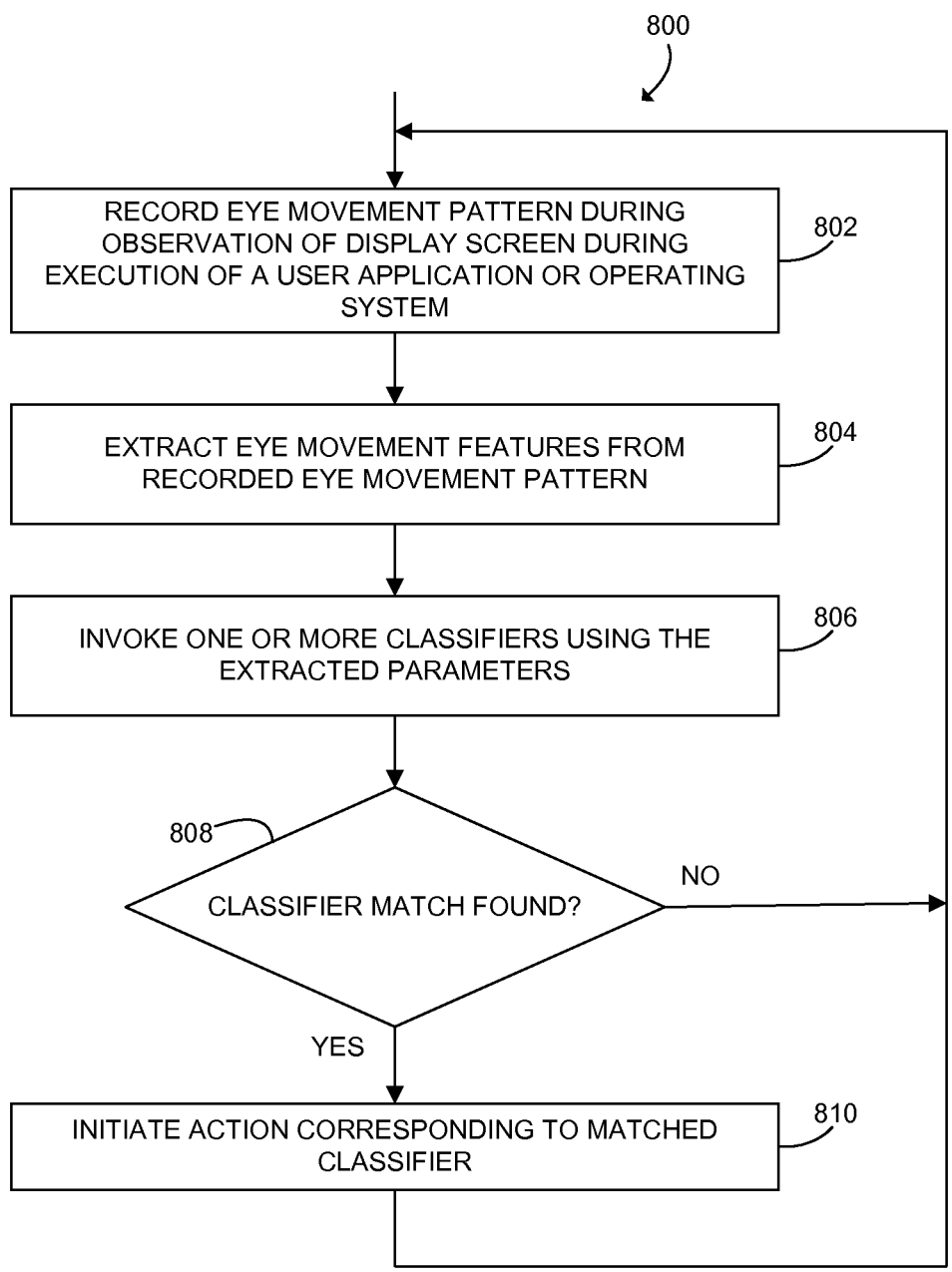
FIG. 8 is a simplified flow diagram of at least one embodiment of a process for performing user intended actions on a display screen of the user computing device based on comparisons of eye movement patterns of the user during observation of the display screen with corresponding predetermined classifiers for the intended actions.

Referring now to FIG. 8, a simplified flow diagram is shown of at least one embodiment of a method 800 for performing the process described in the preceding paragraph. The method 800 may be stored in the memory 116 and/or data storage 118 of the user computing device 102 and/or other machine readable media in the form of one or more sets of instructions executable by the processor 110 of the user computing device 102, stored in the memory 146 and/or data storage 148 of the cloud server 104 and/or other machine readable media in the form of one or more sets of instructions executable by the processor 140 of the cloud server 104, or stored in either one or a combination of the memory 116/data storage 118 and the memory 146/data storage 148 and/or other machine readable media in the form of one or more sets of instructions executable by either one or a combination of the processor 110 of the user computing device 102 and the processor 140 of the cloud server 104. For purposes of facilitating an understanding of the method 800, it will be described below as being stored in the memory 116 of the user computing device 102 in the form of one or more sets of instructions executable by the processor 110 of the user computing device 102, although it will be understood that the method 800 may alternatively or additionally be stored and/or executed, in whole or in part, otherwise as just described above.

The illustrative method 800 begins at block 802 in which the user computing device 102 records the user's eye movement pattern during observation of the display screen 124, i.e., during observation by the user of the graphic content displayed on the display screen 124 resulting from the execution of one or more of the user application(s). Illustratively, the user computing device 102 is operable to record such eye movement patterns by recording one or more of the eye movement features described above. In one embodiment, each recording session is about 5 seconds, although other embodiments are contemplated in which the predetermined time interval may be longer or shorter. Additionally, recording sessions may overlap each other.

After a recording session of the user's eye movement patterns is completed, the user computing device 102 extracts features from the recoded eye movement pattern in block 804. As discussed above, such features are generated by the eye movement processing module 208 (and/or the eye tracking processing module 206) and may include, for example, fixation count, fixation duration, total viewing time, sequential distance, proportion of gaze to each of a number of specified regions on the display screen 124, successive viewing to the same region of the display screen 124, frequency of observation, blink frequency, transition probabilities, percentage of inspected regions, time to first fixation on the specified object or location, fixation rate, saccade amplitude, frequency of correcting saccades, and/or other types of eye movement features.

Subsequently in block 806, one or more classifiers are invoked using the eye movement features generated in block 804. To do so, the features are supplied to the one or more classifiers, which generate a score indicative of how closely those features match the category of observations from which each classifier was derived. In block 808, the user computing device 102 determines whether a matching classifier was found. Such "matching" determination may be based on the highest scoring classifier and/or on those classifiers generating scores above a threshold value.

In one embodiment, the user computing device 102 is configured to execute blocks 806 and 808 by limiting classification of the extracted features using classifiers stored in the classifier database 220 for the particular user application currently being executed and for the particular user currently operating the user computing device 102. However, the present disclosure contemplates adapting, or otherwise using, classifiers of other users for the current user of a user application, and in such embodiments the classification at block 806 may therefore be limited to only classifiers stored in the classifier database 220 for the particular user application currently being executed (i.e., not limited by user). The present disclosure further contemplates adapting classifiers established for one user application to one or more other user applications and, in such embodiments, the classification at block 806 may therefore be limited to only classifiers stored in the classifier database 220 for the particular user currently operating the user computing device 102. The present disclosure yet further contemplates adapting classifiers of other users established for one user applications to one or more other users of one or more other user applications, and in such embodiments the classification at block 806 may therefore not be to any specific user or user application, and may instead extend to classification of extracted features using all classifiers stored in the classifier database 220.

In any case, if the user computing device 102 infers at block 808 that the extracted eye movement features do not match any previously defined user intent based on output of the classifiers stored in the classifier database 220, the method 800 loops back to block 802 such that the most recently recorded eye movement pattern is discarded and a new eye movement pattern is recorded for the next time interval. Of course, as discussed above, the recording sessions of eye movement may be substantially continuous and overlap each other.

If, however, the user computing device 102 infers at block 808 that the extracted features do match a previously defined user intent based on the output of the classifiers stored in the classifier database 220, the user computing device 102 automatically initiates, e.g., selects or activates, or otherwise causes the action in the user application currently being executed that corresponds to the user intent identified in block 808. Thereafter, the method 800 loops back to block 802 in which a new eye movement pattern is recorded for the next time interval.

As described above with respect to the method 800, the user computing device 102 continually monitors eye movement patterns of the user during the user's observation of graphic content displayed on the display screen 124 of the user computing device 102 as a result of execution of one or more of the user application(s) 202 following inference of user intent using the set of classifiers stored in the classifier database 220. A classifier can be subsequently refined by selectively updating the corresponding training set with one or more eye movement pattern records resulting from such continual monitoring of eye movement features, and then either re-learning the classifier based on the updated training set or updating the classifier using the new pattern records. Such refinement will not only increase the overall reliability of matching user eye movement patterns with predefined user intents, but will also serve to facilitate the distinctiveness of any one predefined user-intent relative to another based on the set of classifiers stored in the classifier database 220. As an example of the latter, and using again the example illustrated in FIGS. 6 and 7, because the "accept" tracked changes graphic is positioned directly next to the "reject" tracked changes graphic, some amount of refinement of the classifiers for each may be helpful in order to reliably distinguish between user inferred intent of one action or the other.

Figure 9:
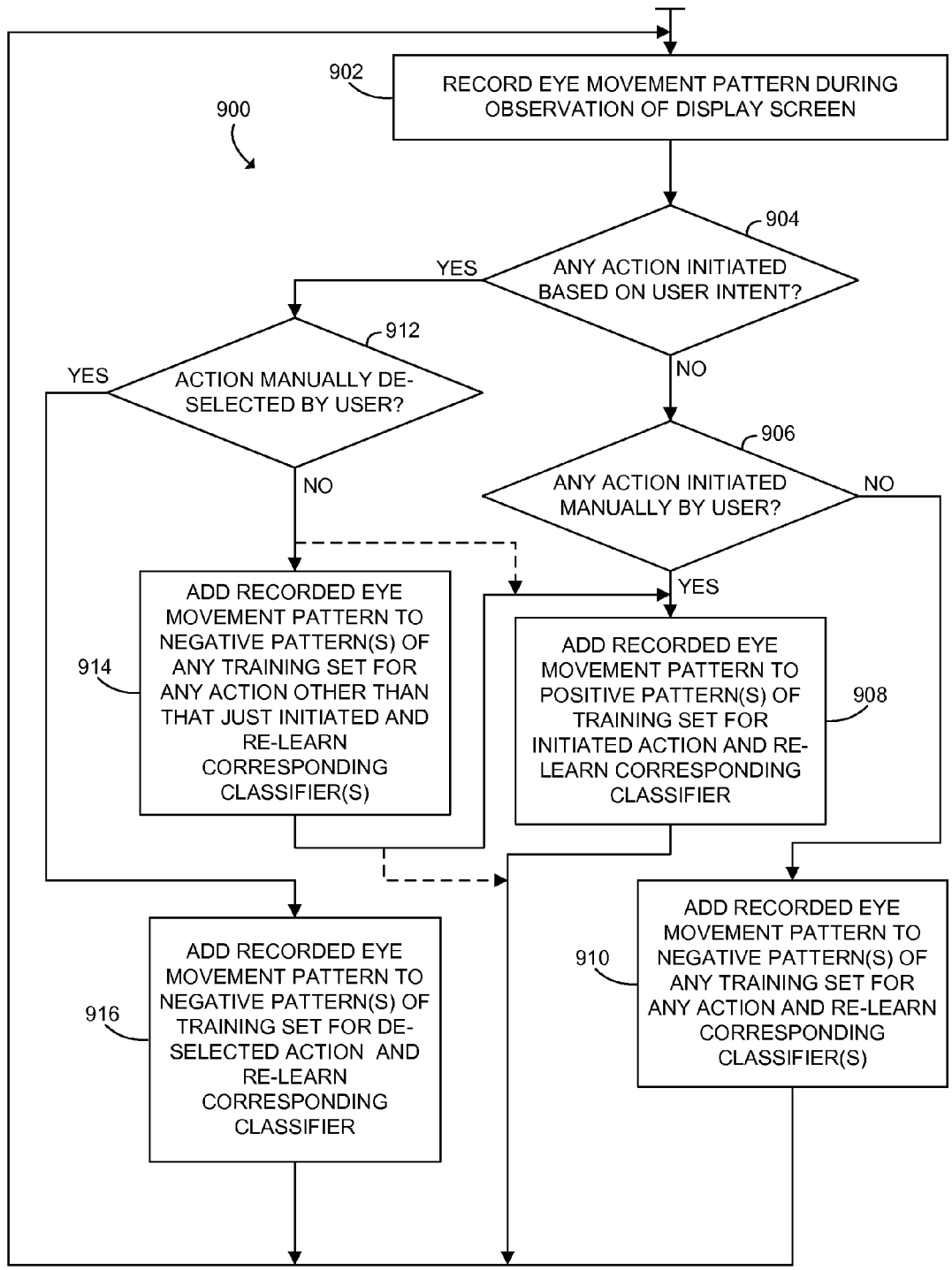
FIG. 9 is a simplified flow diagram of at least one embodiment of a process for refining one or more pre-existing classifiers during observation by the user of the display screen of the user computing device.

Referring now to FIG. 9, a simplified flow diagram is shown of at least one embodiment of a method 900 for refining one or more classifiers stored in the classifier database 220 as described in the preceding paragraph. It should be understood that while the method 900 includes four primary techniques for selectively refining one or more classifiers, the present disclosure contemplates embodiments in which any one or subset of the several techniques may be used to the exclusion of any one or more of the others. In any case, the method 900 may be stored in the memory 116 and/or data storage 118 of the user computing device 102 and/or other machine readable media in the form of one or more sets of instructions executable by the processor 110 of the user computing device 102, stored in the memory 146 and/or data storage 148 of the cloud server 104 and/or other machine readable media in the form of one or more sets of instructions executable by the processor 140 of the cloud server 104, or stored in either one or a combination of the memory 116/data storage 118 and the memory 146/data storage 148 and/or other machine readable media in the form of one or more sets of instructions executable by either one or a combination of the processor 110 of the user computing device 102 and the processor 140 of the cloud server 104. For purposes of facilitating an understanding of the method 900, it will be described below as being stored in the memory 116 of the user computing device 102 in the form of one or more sets of instructions executable by the processor 110 of the user computing device 102, although it will be understood that the method 900 may alternatively or additionally be stored and/or executed, in whole or in part, otherwise as just described above.

The illustrative method 900 begins at block 902 in which the user computing device 102 records the user's eye movement pattern during observation of the display screen 124, i.e., during observation by the user of the graphic content displayed on the display screen 124 resulting from the execution of one or more of the user algorithm(s). Illustratively, the user computing device 102 is operable to record such eye movement patterns by recording one or more of the eye movement features described above. In the illustrative embodiment, the user computing device 102 executes block 902 separately from the method 800. However, in other embodiments, the block 902 may be merged with block 802 of the method 800 into a single block. In any case, the method 900 advances from block 902 to block 904 in which the user computing device 102 determines whether any action has initiated, e.g., selected or activated, based on user intent (i.e., whether the user computing device 102 has, based on the most recent user eye movement record, executed block 808 of the method 800 and automatically initiated an action corresponding to the identified user intent). If not, the method 900 advances to block 906 in which the user computing device 102 determines whether any action relating to the user application currently being executed by the user computing device 102 has been manually initiated, e.g., selected or activated, by the user. If so, this means that the user intended to initiate the action, but the user computing device 102 did not automatically initiate the action, and that the most recent eye movement pattern record therefore represents a positive eye movement pattern record that should be added to the training set corresponding to the manually initiated action. The method 900 thus advances to block 908 where the processor 110 adds the recorded eye movement pattern, i.e., the most recent eye movement pattern record, to the positive pattern records of the training set that corresponds to the manually initiated action, and then re-learns (or updates) the corresponding classifier, e.g., re-executes block 426 of the method 400 illustrated in FIG. 4.

If, however, the user computing device 102 instead determines that no action relating to the user application currently being executed by the user computing device 102 was initiated manually by the user (which means that the processor 110 did not initiate any action and that no action was intended to be initiated by user), the method 900 advances to block 910. In block 910, the most recent user eye movement pattern record is determined to represent a neutral observation and is added to the negative pattern records of any one or more training sets in the user-intent training database 218. Additionally, the user computing device 102 subsequently updates the corresponding classifier, e.g., re-executes block 426 of the method 400 illustrated in FIG. 4, in block 910. In another embodiment of block 910, the user computing device 102 adds the recorded eye movement pattern to the negative pattern records of all training sets in the user-intent training database 218, and then re-learns or updates the corresponding classifier.

Referring now back to block 904, if the user computing device 102 determines that an action has been initiated based on user intent (i.e., that the user computing device 102 has executed block 808 of the method 800 illustrated in FIG. 8 based on the most recent user eye movement record), the method 900 advances to block 912 in which user computing device 102 determines whether the action just initiated was manually deselected by the user. If not, such a situation may mean that the user computing device 102 initiated an action and that this action was intended to be initiated by user. The most recent user eye movement pattern record may, therefore, represent a positive eye movement pattern training record that may be added to the positive pattern records of the training set corresponding to the processor-initiated action, and also represents an alternate positive pattern training record, as described above, and may therefore alternatively or additionally be added to the negative pattern records of any training set other than that for which the action was just initiated by the processor 110.

As such, in some embodiments, the method 900 may advance to block 914 in which the user computing device 102 adds the recorded eye movement pattern (i.e., the most recent eye movement pattern record), to the negative pattern records of any one or more training sets in the user-intent training database 218 other than that for which the action was just initiated by the user computing device 102, and then re-learns the corresponding classifier. Additionally, in some embodiments, the method 900 may subsequently advance to block 908 in which the user computing device 102 adds the recorded eye movement pattern, i.e., the most recent eye movement pattern record, to the positive pattern records of the training set that corresponds to the action just initiated by the user computing device 102, and then re-learns or updates the corresponding classifier. As shown by dashed lines in FIG. 9, the present disclosure contemplates other embodiments in which either one of blocks 908 and 914, or both, are executed following the "NO" branch of block 912.

Referring now back to block 912, if the user computing device 102 determines that the action just initiated based on the most recent eye movement pattern record was manually deselected by the user, such situation may mean that the user computing device 102 initiated the action contrary to the intent of the user. The most recent user eye movement pattern record therefore may represent a negative eye movement training record for the de-selected action, and may therefore be added to the negative pattern records of the training set in the user-intent training database 218, which corresponds to the de-selected action. The method 900 thus advances to block 916 in which the user computing device 102 adds the recorded eye movement pattern, i.e., the most recent eye movement pattern record, to the negative pattern records of the training set that corresponds to the manually de-selected action, and then re-learns (or adapts) the corresponding classifier.

EXAMPLES

Illustrative examples of the devices, systems, and methods disclosed herein are provided below. An embodiment of the devices, systems, and methods may include any one or more, and any combination of, the examples described below.

Example 1 includes a user computing device to infer user intent to initiate action on the user computing device. The user computing device includes a display screen to display graphic content resulting from execution of a user application; an eye movement processing module to process signals relating to eye movement of a user viewing the graphic content on the display screen to produce at least one eye movement feature; a user-intent learning module to (i) generate a training set of data comprising at least one record of the at least one eye movement feature over a first time interval in which the user observes the graphic content on the display screen with an intent to initiate the action and (ii) learn a classifier for the action from the training set of data; a classification module to (i) invoke the classifier using a record of the at least one eye movement feature over a second time interval in which the user observes the graphic content on the display screen and (ii) infer an intent of the user to initiate the action as a function of the output of the classifier; and an action selection module to automatically activate the action in response to inferring that the intent of the user is to initiate the action.

Example 2 includes the subject matter of Example 1, and further including a user-intent training database, wherein the user-intent learning module to store in the user-intent training database the at least one record of the at least one eye movement feature over the first time interval in which the user observes the graphic content on the display screen with the intent to initiate the action.

Example 3 includes the subject matter of any of Examples 1 and 2, and wherein the user-intent learning module comprises a positive-pattern gathering sub-module to generate at least one positive pattern record of the at least one eye movement feature of the first time interval in which the user observes the graphic content on the display screen with the intent to initiate the action, and to store the at least one positive pattern record in the user-intent training database.

Example 4 includes the subject matter of any of Examples 1-3, and wherein the user-intent learning module comprises a negative-pattern gathering sub-module to generate at least one negative pattern record of the at least one eye movement feature over a third time interval in which the user observes the graphic content on the display screen with an intent to not activate the action, and to store the at least one negative pattern record in the user-intent training database.

Example 5 includes the subject matter of any of Examples 1-4, and wherein the graphic content includes a plurality of action graphics, each action graphic to initiate a corresponding action within the user application in response to being activated, and wherein the user-intent learning module comprises a negative-pattern gathering sub-module to generate a negative pattern record of the at least one eye movement feature over a third time interval in which the user observes the graphic content on the display screen with an intent to not activate any of the plurality of action graphics, and to store the negative pattern record in the user-intent training database.

Example 6 includes the subject matter of any of Examples 1-5, and wherein the graphic content includes a plurality of action graphics including a first action graphic, each action graphic to initiate a corresponding action within the user application in response to being activated, and wherein the user-intent learning module comprises a negative-pattern gathering sub-module to generate a negative pattern record of the at least one eye movement feature over a third time interval in which the user observes the graphic content on the display screen with an intent to activate any of the plurality of action graphics other than the first action graphic, and to store the negative pattern record in the user-intent training database.

Example 7 includes the subject matter of any of Examples 1-6, and wherein the graphic content includes a plurality of action graphics including a first action graphic, each action graphic to initiate a corresponding action within the user application in response to being activated, and wherein the user-intent learning module comprises a negative-pattern gathering sub-module to generate (i) a first negative pattern record of the at least one eye movement feature over a third time interval in which the user observes the graphic content on the display screen with an intent to not activate the first action graphic, (ii) a second negative pattern record of the at least one eye movement feature over a fourth time interval in which the user observes the graphic content on the display screen with an intent to not activate any of the plurality of action graphics, and (iii) a fourth negative pattern record of the at least one eye movement feature over a fifth time interval in which the user observes the graphic content on the display screen with an intent to activate any of the plurality of action graphics other than the first action graphic, the user-intent learning module further to store the first negative pattern record, the second negative pattern record, and the third negative pattern record in the user-intent training database.

Example 8 includes the subject matter of any of Examples 1-7, and wherein the user-intent learning module comprises a classifier learning sub-module to learn the classifier from the training set of data.

Example 9 includes the subject matter of any of Examples 1-8, and wherein the classifier learning sub-module comprises a learning algorithm to learn the classifier from the training set of data.

Example 10 includes the subject matter of any of Examples 1-9, and wherein the learning algorithm comprises a machine learning algorithm.

Example 11 includes the subject matter of any of Examples 1-10, and wherein the learning algorithm is configured to learn the classifier using a classification or clustering method implementing at least one of a support vector machine, spectral clustering, Fisher discriminant analysis, Bayes classifiers and mixture of Gaussians.

Example 12 includes the subject matter of any of Examples 1-11, and wherein the classification module is to (i) invoke a plurality of classifiers using the record of the at least one eye movement feature over the second time interval and (ii) infer an intent of the user to initiate the action as a function of the output of each of the invoked classifiers.

Example 13 includes the subject matter of any of Examples 1-12, and wherein the plurality of classifiers comprises at least one classifier for another action.

Example 14 includes the subject matter of any of Examples 1-13, and further including a classifier refinement module to relearn the classifier using the record of the at least one eye movement feature over the second time interval in which the user observes the graphic content of the display screen.

Example 15 includes the subject matter of any of Examples 1-14, and wherein the user-intent learning module is to store the training set of data in a user-intent training database, and further including a classifier refinement module to (i) update the training set of data by adding, to the training set of data, the record of the at least one eye movement feature over the second time interval in which the user observes the graphic content of the display screen and (ii) relearn the classifier from the updated training set of data.

Example 16 includes the subject matter of any of Examples 1-15, and wherein the classifier refinement module to add the record of the at least one eye movement feature over the second time interval in which the user observes the graphic content of the display to the training set of data as a positive pattern record if at least one of (i) the action selection module activates a first action graphic corresponding to the action and the first action graphic is thereafter not manually de-selected and (ii) the action selection module does not activate the first action graphic and the first action graphic is thereafter manually selected.

Example 17 includes the subject matter of any of Examples 1-16, and wherein the classifier refinement module to add the record of the at least one eye movement feature over the second time interval in which the user naturally the graphic content of the display to the training set of data as a negative pattern record if (i) the action selection module activates the first action graphic and (ii) the first action graphic is thereafter manually de-selected.

Example 18 includes the subject matter of any of Examples 1-17, and wherein the graphic content includes a plurality of action graphics including a first action graphic, each action graphic to initiate a corresponding action within the user application in response to being activated, the user-intent training database has stored therein a plurality of training sets of data each for a different one of the plurality of action graphics, and the classifier refinement module to add the record of the at least one eye movement feature over the second time interval in which the user observes the graphic content of the display to any of the plurality of training sets of data as a negative pattern record if the action selection module does not activate the first action graphic and the none of the plurality of action graphics is thereafter manually activated.

Example 19 includes the subject matter of any of Examples 1-18, and wherein the graphic content includes a plurality of action graphics including a first action graphic, each action graphic to initiate a corresponding action within the user application in response to being activated, the user-intent training database has stored therein a plurality of training sets of data each for a different one of the plurality of action graphics, and the classifier refinement module to add the record of the at least one eye movement feature over the second time interval in which the user observes the graphic content of the display as a negative pattern record to any of the plurality of training sets of data other than the training set of data for the first action graphic if the action selection module does activates the first action graphic and the first action graphics is thereafter not manually de-selected.

Example 20 includes a method of inferring user intent to initiate an action of a user application executed on a user computing device. The method includes processing signals relating to eye movement of a user viewing graphic content displayed by the user computing device in response to execution of the user application to produce at least one eye movement feature; generating a training set of data comprising at least one record of the at least one eye movement feature over a first time interval in which the user observes the graphic content on the display screen with an intent to initiate the action; learning a classifier for the action from the training set of data; invoking the classifier using a record of the at least one eye movement feature over a second time interval in which the user observes the graphic content of the display; inferring an intent of the user to initiate the action as a function of the output of the classifier; and automatically initiating the action in response to inferring that the intent of the user is to initiate the action.

Example 21 includes the subject matter of Example 20, and further including comprising storing in a user-intent training set database the at least one record of the at least one eye movement feature over the first time interval in which the user observes the graphic content on the display screen with the intent initiate the action.

Example 22 includes the subject matter of any of Examples 20 and 21, and wherein the at least one record of the at least one eye movement feature of the first time interval in which the user observes the graphic content on the display screen with the intent to initiate the action comprises at least one positive pattern record.

Example 23 includes the subject matter of any of Examples 20-22, and further including generating a negative pattern record of the at least one eye movement feature over a third time interval in which the user observes the graphic content on the display screen with an intent to not initiate the action, and storing the at least one negative pattern record in the user-intent training database.

Example 24 includes the subject matter of any of Examples 20-23, and wherein the graphic content includes a plurality of action graphics, each action graphic initiates a corresponding action within the user application in response to being activated, and wherein the method further includes generating a negative pattern record of the at least one eye movement feature over a third time interval in which the user observes the graphic content on the display screen with an intent to not activate any of the plurality of action graphics.

Example 25 includes the subject matter of any of Examples 20-24, and wherein the graphic content includes a plurality of action graphics including a first action graphic, each action graphic initiates a corresponding action within the user application in response to being activated, and wherein the method further includes generating a negative pattern record of the at least one eye movement feature over a third time interval in which the user observes the graphic content on the display screen with an intent to activate any of the plurality of action graphics other than the first action graphic.

Example 26 includes the subject matter of any of Examples 20-25, and wherein the graphic content includes a plurality of action graphics including a first action graphic, each action graphic initiates a corresponding action within the user application in response to being activated, and wherein method further includes generating (i) a first negative pattern record of the at least one eye movement feature over a third time interval in which the user observes the graphic content on the display screen with an intent to not activate the first action graphic, (ii) a second negative pattern record of the at least one eye movement feature over a fourth time interval in which the user observes the graphic content on the display screen with an intent to not activate any of the plurality of action graphics, and (iii) a third negative pattern record of the at least one eye movement feature over a fifth time interval in which the user observes the graphic content on the display screen with an intent to activate any of the plurality of action graphics other than the first action graphic.

Example 27 includes the subject matter of any of Examples 20-26, and determining the classifier comprises learning the classifier from the training set of data.

Example 28 includes the subject matter of any of Examples 20-27, and learning the classifier comprises using one of a learning algorithm and a machine learning algorithm to learn the classifier from the training set of data.

Example 29 includes the subject matter of any of Examples 20-28, and wherein learning the classifier comprises using a classification or clustering method which implements at least one of a Support vector machine, spectral clustering, Fisher discriminant analysis, Bayes classifiers and mixture of Gaussians.

Example 30 includes the subject matter of any of Examples 20-29, and wherein invoking the classifier comprises invoking a plurality of classifiers using the record of the at least one eye movement feature over the second time interval, and wherein inferring the intent of the user comprises inferring the intent of the user to initiate the action as a function of the output of each of the invoked classifiers.

Example 31 includes the subject matter of any of Examples 20-30, and wherein the plurality of classifiers comprises at least one classifier for another action.

Example 32 includes the subject matter of any of Examples 20-31, and further including relearning the classifier as a function of the record of the at least one eye movement feature over the second time interval in which the user observes the graphic content of the display screen.

Example 33 includes the subject matter of any of Examples 20-32, and further including updating the training set of data by adding to the training set of data the record of the at least one eye movement feature over the second time interval in which the user observes the graphic content of the display screen, and relearning the classifier from the updated training set of data.

Example 34 includes the subject matter of any of Examples 20-33, and wherein updating the training set of data comprises adding the record of the at least one eye movement feature over the second time interval in which the user observes the graphic content of the display to the training set of data as a positive pattern record if at least one of (i) the action selection module activates a first action graphic and the first action graphic is thereafter not manually de-selected and (ii) the action selection module does not activate the first action graphic and the first action graphic is thereafter manually de-selected.

Example 35 includes the subject matter of any of Examples 20-34, and wherein updating the training set of data comprises adding the record of the at least one eye movement feature over the second time interval in which the user observes the graphic content of the display to the training set of data as a negative pattern record if (i) the action selection module activates the first action graphic and (ii) the first action graphic is thereafter manually de-selected.

Example 36 includes the subject matter of any of Examples 20-35, and wherein the graphic content includes a plurality of action graphics including a first action graphic, each action graphic initiates a corresponding action within the user application in response to being activated, a plurality of training sets of data, each for a different one of the plurality of action graphics, are stored in a user-intent training set database, and wherein updating the training set of data includes adding the record of the at least one eye movement feature over the second time interval in which the user observes the graphic content of the display to any of the plurality of training sets of data as a negative pattern record if the action selection module does not activate the first action graphic and the none of the plurality of action graphics is thereafter manually activated.

Example 37 includes the subject matter of any of Examples 20-36, and wherein the graphic content includes a plurality of action graphics including a first action graphic, each action graphic initiates a corresponding action within the user application in response to being activated, a plurality of training sets of data, each for a different one of the plurality of action graphics, are stored in a user-intent training set database, and wherein updating the training set of data comprises adding the record of the at least one eye movement feature over the second time interval in which the user observes the graphic content of the display as a negative pattern record to any of the plurality of training sets of data other than the training set of data for the first action graphic if the action selection module does activates the first action graphic and the first action graphics is thereafter not manually de-selected.

Example 38 includes a computing device having a processor and a memory having stored therein a plurality of instructions that, in response to being executed by the processor, results in the computing device performing the method of any of Examples 20-37.

Example 39 includes one or more machine readable media comprising a plurality of instructions stored thereon that in response to being executed result in a computing device performing the method of any of Examples 20-37.

Example 40 includes system to infer user intent of an action. The system includes a user computing device according to any of Examples 1-19, and a cloud server communicatively coupled to the user computing device via a network, wherein the server comprises at least one of the eye movement processing module, the user-intent learning module, the classification module, the action selection module, and the classifier refinement module.

Example 41 includes the subject matter of Example 40, and further includes a video camera to produce the signals relating to eye movement of a user viewing the graphic content on the display screen.

The invention claimed is:

1. A user computing device to infer user intent to initiate action on the user computing device, comprising:
    a display screen to display graphic content resulting from execution of a user application,
    an eye movement processing module to process signals relating to eye movement of a user viewing the graphic content on the display screen to produce at least one eye movement feature,
    a user-intent learning module to
        (i) generate a training set of data comprising at least one record of the at least one eye movement feature over a first time interval in which the user observes the graphic content on the display screen with an intent to initiate the action and
        (ii) learn a classifier for the action from the training set of data,
    a classification module to
        (i) invoke the classifier using a record of the at least one eye movement feature over a second time interval in which the user observes the graphic content on the display screen and
        (ii) infer an intent of the user to initiate the action as a function of the output of the classifier; and
    an action selection module to automatically activate the action in response to inferring that the intent of the user is to initiate the action.

2. The user computing device of claim 1, further comprising a user-intent training database,
wherein the user-intent learning module to store in the user-intent training database the at least one record of the at least one eye movement feature over the first time interval in which the user observes the graphic content on the display screen with the intent to initiate the action.

3. The user computing device of claim 2, wherein the user-intent learning module comprises a positive-pattern gathering sub-module to generate at least one positive pattern record of the at least one eye movement feature of the first time interval in which the user observes the graphic content on the display screen with the intent to initiate the action, and to store the at least one positive pattern record in the user-intent training database.

4. The user computing device of claim 3, wherein the user-intent learning module comprises a negative-pattern gathering sub-module to generate at least one negative pattern record of the at least one eye movement feature over a third time interval in which the user observes the graphic content on the display screen with an intent to not activate the action, and to store the at least one negative pattern record in the user-intent training database.

5. The user computing device of claim 3, wherein the graphic content includes a plurality of action graphics, each action graphic to initiate a corresponding action within the user application in response to being activated,
and wherein the user-intent learning module comprises a negative-pattern gathering sub-module to generate a negative pattern record of the at least one eye movement feature over a third time interval in which the user observes the graphic content on the display screen with an intent to not activate any of the plurality of action graphics, and to store the negative pattern record in the user-intent training database.

6. The user computing device of claim 3, wherein the graphic content includes a plurality of action graphics including a first action graphic, each action graphic to initiate a corresponding action within the user application in response to being activated,
and wherein the user-intent learning module comprises a negative-pattern gathering sub-module to generate a negative pattern record of the at least one eye movement feature over a third time interval in which the user observes the graphic content on the display screen with an intent to activate any of the plurality of action graphics other than the first action graphic, and to store the negative pattern record in the user-intent training database.

7. The user computing device of claim 3, wherein the graphic content includes a plurality of action graphics including a first action graphic, each action graphic to initiate a corresponding action within the user application in response to being activated,
and wherein the user-intent learning module comprises a negative-pattern gathering sub-module to generate
(i) a first negative pattern record of the at least one eye movement feature over a third time interval in which the user observes the graphic content on the display screen with an intent to not activate the first action graphic,
(ii) a second negative pattern record of the at least one eye movement feature over a fourth time interval in which the user observes the graphic content on the display screen with an intent to not activate any of the plurality of action graphics, and
(iii) a fourth negative pattern record of the at least one eye movement feature over a fifth time interval in which the user observes the graphic content on the display screen with an intent to activate any of the plurality of action graphics other than the first action graphic,
the user-intent learning module further to store the first negative pattern record, the second negative pattern record, and the third negative pattern record in the user-intent training database.

8. The user computing device of claim 1, wherein the classification module is to
(i) invoke a plurality of classifiers, including a classifier for another action, using the record of the at least one eye movement feature over the second time interval and
(ii) infer an intent of the user to initiate the action as a function of the output of each of the invoked classifiers.

9. The user computing device of claim 1, further comprising a classifier refinement module to relearn the classifier using the record of the at least one eye movement feature over the second time interval in which the user observes the graphic content of the display screen.

10. One or more non-transitory machine-readable storage media comprising a plurality of instructions stored thereon that, in response to being executed, result in a computing device:
processing signals relating to eye movement of a user viewing graphic content displayed by the user computing device in response to execution of a user application to produce at least one eye movement feature,
generating a training set of data comprising at least one record of the at least one eye movement feature over a first time interval in which the user observes the graphic content on the display screen with an intent to initiate an action,
determining a classifier for the action from the training set of data, invoking the classifier using a record of the at least one eye movement feature over a second time interval in which the user observes the graphic content of the display;
inferring an intent of the user to initiate the action as a function of the output of the classifier; and
automatically initiating the action in response to inferring that the intent of the user is to initiate the action.

11. The one or more machine-readable storage media of claim 10, wherein the plurality of instructions further result in the computing device storing, in a user-intent training set database, the at least one record of the at least one eye movement feature over the first time interval in which the user observes the graphic content on the display screen with the intent initiate the action, wherein the at least one record comprises at least one positive pattern record.

12. The one or more machine-readable storage media of claim 11, wherein the plurality of instructions further result in the computing device:
generating a negative pattern record of the at least one eye movement feature over a third time interval in which the user observes the graphic content on the display screen with an intent to not initiate the action, and
storing the at least one negative pattern record in the user-intent training database.

13. The one or more machine-readable storage media of claim 11, wherein the graphic content includes a plurality of action graphics, each action graphic initiates a corresponding action within the user application in response to being activated, and wherein the plurality of instructions further result in the computing device generating a negative pattern record of the at least one eye movement feature over a third time interval in which the user observes the graphic content on the display screen with an intent to not activate any of the plurality of action graphics.

14. The one or more machine-readable storage media of claim 11, wherein the graphic content includes a plurality of action graphics including a first action graphic, each action graphic initiates a corresponding action within the user application in response to being activated,
and wherein the plurality of instructions further result in the computing device generating a negative pattern record of the at least one eye movement feature over a third time interval in which the user observes the graphic content on the display screen with an intent to activate any of the plurality of action graphics other than the first action graphic.

15. The one or more machine-readable storage media of claim 11, wherein the graphic content includes a plurality of action graphics including a first action graphic, each action graphic initiates a corresponding action within the user application in response to being activated, and
wherein the plurality of instructions further result in the computing device generating
(i) a first negative pattern record of the at least one eye movement feature over a third time interval in which the user observes the graphic content on the display screen with an intent to not activate the first action graphic,
(ii) a second negative pattern record of the at least one eye movement feature over a fourth time interval in which the user observes the graphic content on the display screen with an intent to not activate any of the plurality of action graphics, and
(iii) a third negative pattern record of the at least one eye movement feature over a fifth time interval in which the user observes the graphic content on the display screen with an intent to activate any of the plurality of action graphics other than the first action graphic.

16. The one or more machine-readable storage media of claim 10, wherein determining the classifier comprises learning the classifier from the training set of data.

17. The one or more machine-readable storage media of claim 10, wherein invoking the classifier comprises invoking a plurality of classifiers, including at least one classifier for another action, using the record of the at least one eye movement feature over the second time interval, and
wherein inferring the intent of the user comprises inferring the intent of the user to initiate the action as a function of the output of each of the invoked classifiers.

18. The one or more machine-readable storage media of claim 10, wherein the plurality of instructions further result in the computing device:
updating the training set of data by adding to the training set of data the record of the at least one eye movement feature over the second time interval in which the user observes the graphic content of the display screen, and
relearning the classifier from the updated training set of data.

19. A method of inferring user intent to initiate an action of a user application executed on a user computing device, the method comprising:
processing signals relating to eye movement of a user viewing graphic content displayed by the user computing device in response to execution of the user application to produce at least one eye movement feature;
generating a training set of data comprising at least one positive pattern record of the at least one eye movement feature over a first time interval in which the user observes the graphic content on the display screen with an intent to initiate the action;
storing, in a user-intent training set database, the training set of data;
learning a classifier for the action from the training set of data;
invoking the classifier using a record of the at least one eye movement feature over a second time interval in which the user observes the graphic content of the display;
inferring an intent of the user to initiate the action as a function of the output of the classifier; and
automatically initiating the action in response to inferring that the intent of the user is to initiate the action.

20. The method of claim 19, further comprising generating a negative pattern record of the at least one eye movement feature over a third time interval in which the user observes the graphic content on the display screen with an intent to not initiate the action, and storing the at least one negative pattern record in the user-intent training database.

21. The method of claim 19, wherein the graphic content includes a plurality of action graphics, each action graphic initiates a corresponding action within the user application in response to being activated,
and wherein the method further comprises generating a negative pattern record of the at least one eye movement feature over a third time interval in which the user observes the graphic content on the display screen with an intent to not activate any of the plurality of action graphics.

22. The method of claim 19, wherein the graphic content includes a plurality of action graphics including a first action graphic, each action graphic initiates a corresponding action within the user application in response to being activated,
and wherein the method further comprises generating a negative pattern record of the at least one eye movement feature over a third time interval in which the user observes the graphic content on the display screen with an intent to activate any of the plurality of action graphics other than the first action graphic.

23. The method of claim 19, wherein the graphic content includes a plurality of action graphics including a first action graphic, each action graphic initiates a corresponding action within the user application in response to being activated,
and wherein method further comprises generating
(i) a first negative pattern record of the at least one eye movement feature over a third time interval in which the user observes the graphic content on the display screen with an intent to not activate the first action graphic,
(ii) a second negative pattern record of the at least one eye movement feature over a fourth time interval in which the user observes the graphic content on the display screen with an intent to not activate any of the plurality of action graphics, and
(iii) a third negative pattern record of the at least one eye movement feature over a fifth time interval in which the user observes the graphic content on the display screen with an intent to activate any of the plurality of action graphics other than the first action graphic.

\* \* \* \* \*